(12) United States Patent
Benson et al.

(10) Patent No.: US 12,143,751 B2
(45) Date of Patent: *Nov. 12, 2024

(54) SYSTEM AND METHOD FOR SOCIAL PLATFORM IMPLEMENTED TIMED ONE-ON-ONE VIDEO CONFERENCE CALLS

(71) Applicant: SQQ Inc, Astoria, NY (US)

(72) Inventors: Dave Benson, Astoria, NY (US); Jonathan Warnock, New York, NY (US); Ben Kruger, West Orange, NJ (US)

(73) Assignee: SQQ Inc, Astoria, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,621

(22) Filed: Nov. 28, 2022

(65) Prior Publication Data

US 2023/0164295 A1 May 25, 2023

Related U.S. Application Data

(63) Continuation-in-part of application No. 17/738,275, filed on May 6, 2022, now Pat. No. 11,962,629,
(Continued)

(51) Int. Cl.
*H04N 7/14* (2006.01)
*G06F 3/14* (2006.01)
*H04L 65/403* (2022.01)

(52) U.S. Cl.
CPC ........... *H04N 7/147* (2013.01); *G06F 3/1454* (2013.01); *H04L 65/403* (2013.01)

(58) Field of Classification Search
CPC .............................. H04N 7/147; G06F 3/1454
See application file for complete search history.

(56) References Cited

U.S. PATENT DOCUMENTS 8,717,403 B1 * 5/2014 Kalevo .................... H04N 7/15
348/14.02
2005/0243063 A1 * 11/2005 Mauron .................. G04F 1/005
345/159

(Continued)

*Primary Examiner* — Amal S Zenati
(74) *Attorney, Agent, or Firm* — Meister Seelig & Fein PLLC

(57) ABSTRACT

A method for facilitating a timed video call performed by a user account associated with a social media platform server designed to support communication among a defined group of users, the social media platform server being coupled to a communication network. The method includes receiving over the communication network a request from a host user on a first user device to initiate a timed video call with a guest user on a second user device, the timed video call having a predefined duration, the request including a typed command following a predetermined syntax. The method further includes parsing the typed command to identify the guest user and second user device and transmitting the request over the communication network to an application programming interface of a communication server. Transmission of the request causes the application programming interface to transmit over the communication network to the user account a first and second unique meeting link to participate in the timed video call. The method further includes transmitting the first unique meeting link to the first user device and the second unique meeting link to the second user device, wherein a response to at least one of the first or second unique meeting link by at least one of the host user or the guest user is received by the communication server over the communication network. Based at least in part on the received response, the response being configured to redirect the at least host user or the guest user to the communication server which initiates the timed video call to stream video and audio between the first user device and the second user device, the streamed video and audio rendered on a call interface on the first user device and the second user (Continued)

device, the call interface including a timer corresponding to a length of time used in or remaining from the predefined duration of the timed video call. The method ends when the end of the predefined duration causes the termination of the timed video call by the communication server.

21 Claims, 40 Drawing Sheets

Related U.S. Application Data which is a continuation-in-part of application No. 17/556,629, filed on Dec. 20, 2021, now Pat. No. 11,722,637, which is a continuation of application No. 17/196,687, filed on Mar. 9, 2021, now Pat. No. 11,240,467.

(56) References Cited

U.S. PATENT DOCUMENTS

| | | | |
|---|---|---|---|
| 2015/0156150 A1* | 6/2015 | Bartkiewicz | G06F 3/048 715/752 |
| 2016/0269504 A1* | 9/2016 | Johar | H04L 67/141 |
| 2019/0364144 A1* | 11/2019 | Stradley | H04N 7/152 |
| 2020/0036940 A1* | 1/2020 | Jeon | H04M 3/567 |
| 2020/0067993 A1* | 2/2020 | Eskafi | H04L 65/4015 |

* cited by examiner

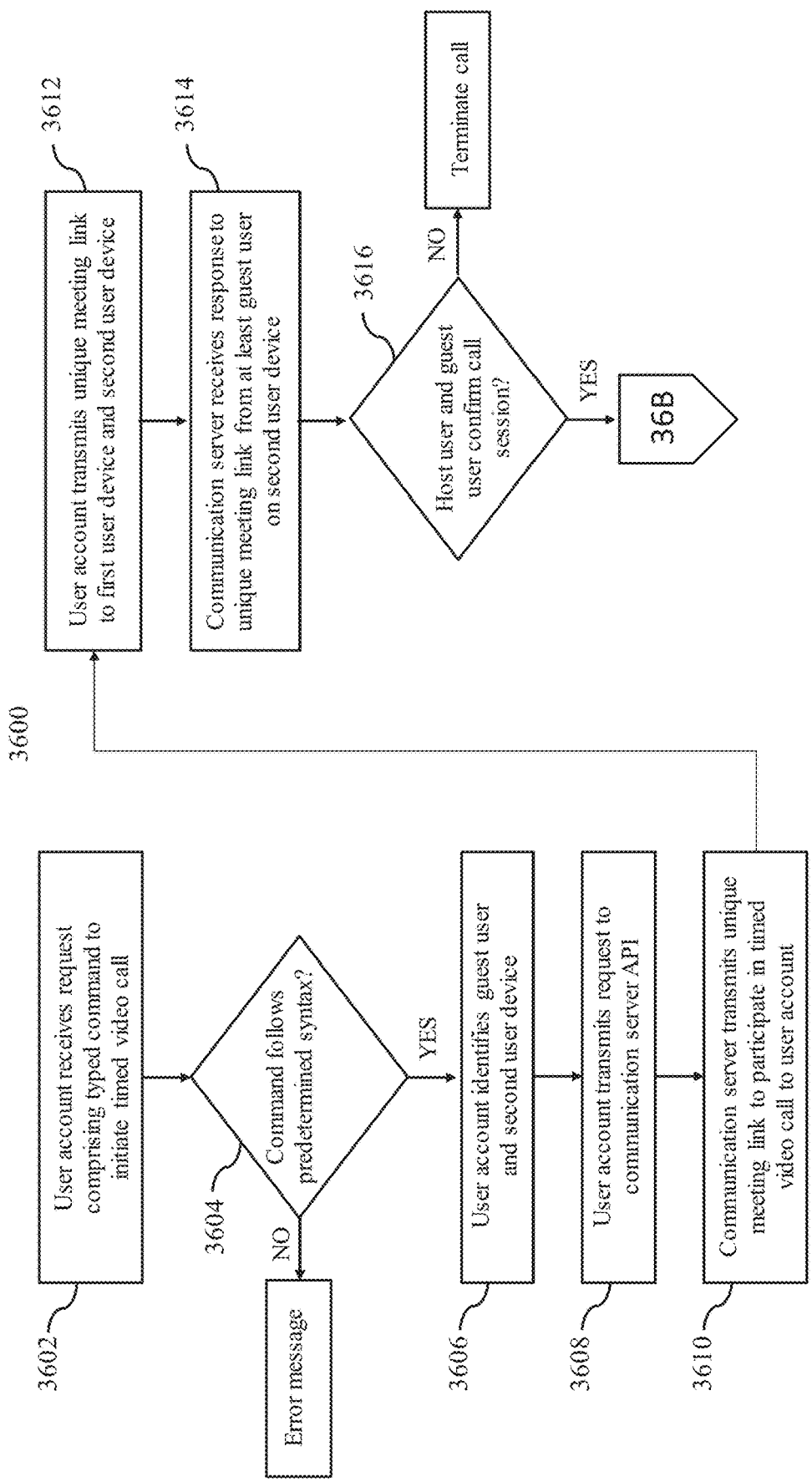

SYSTEM AND METHOD FOR SOCIAL PLATFORM IMPLEMENTED TIMED ONE-ON-ONE VIDEO CONFERENCE CALLS

CROSS REFERENCE TO RELATED APPLICATION

This application is a continuation-in-part of U.S. patent application Ser. No. 17/738,275, entitled "SYSTEM AND METHOD FOR QUEUED AND TIMED ONE-ON-ONE VIDEO CONFERENCE CALLS," filed on May 6, 2022, which is a continuation-in-part of U.S. patent application Ser. No. 17/556,629, entitled "SYSTEM AND METHOD FOR A TIMED ONE-ON-ONE VIDEO CONFERENCE CALL," filed on Dec. 20, 2021, which is a continuation of U.S. application Ser. No. 17/196,687, entitled "SYSTEM AND METHOD FOR A TIMED ONE-ON-ONE VIDEO CONFERENCE CALL," filed on Mar. 9, 2021, now issued as U.S. Pat. No. 11,240,467 on Feb. 1, 2022, the disclosures of which are hereby incorporated by reference in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE SPECIFICATION

This application generally relates to a system and method for a timed video call.

Communication is shifting from in-person chats to written communication and virtual conferencing. Virtual conferencing may include collaborative communication sessions that are established between communication devices across a communications network. Information shared during virtual conferencing may include video, audio, chat, and/or other digital content. However, companies are experiencing a corrosion of culture, a lack of communication, and a decrease in morale due to an abundance of unproductive and unnecessary virtual conferencing. Many virtual conferences are meant to substitute for collision meetings that used to occur before working remotely was so prevalent. Collision meetings are unscheduled casual and fast meetings, including water cooler talk, elevator pitches, office pop-ins, desk swing-bys, and others. Virtual conferences tend to exceed their expected duration and often lack organization, direction, and efficiency of communication.

A timed video call, on the other hand, enables users to meet virtually and concisely discuss definitive points, address target topics, and engage in a Q&A session. Thus, a video call with a short, predefined duration may result in a more efficient virtual conference. A timed video call can increase productivity by facilitating fast, organized, and effective communication so that users may quickly address the purpose of the call and then continue with their day. Furthermore, there is clear benefit to be gained from implementing a timed video call in a social media environment modeled on rapid, focused exchanges, such as on a social media platform like Discord®.

SUMMARY

In an embodiment, a computer-implemented method for a timed video call is disclosed. The computer implemented method is performed by a user account associated with a social media platform server designed to support communication among a defined group of users, the social media platform server being coupled to a communication network. The method comprises receiving over the communication network a request from a host user on a first user device to initiate the timed video call with a guest user on a second user device, the timed video call having a predefined duration, the request comprising a typed command following a predetermined syntax. The method further comprises parsing the typed command to identify the guest user and the second user device and transmitting the request over the communication network to an application programming interface of a communication server, wherein transmission of the request causes the application programming interface to transmit over the communication network to the user account a first and second unique meeting link to participate in the timed video call. The method further comprises transmitting the first unique meeting link to the first user device and the second unique meeting link to the second user device, wherein a response to at least one of the first or second unique meeting link by at least one of the host user or the guest user is received by the communication server over the communication network. Based at least in part on the received response, the response being configured to redirect the at least host user or the guest user to the communication server, the method further comprises initiating, by the communication server, the timed video call to stream video and audio between the first user device and the second user device, the streamed video and audio rendered on a call interface on the first user device and the second user device, the call interface including a timer corresponding to a length of time used in or remaining from the predefined duration of the timed video call. The method ends when the end of the predefined duration causes the termination of the timed video call by the communication server.

In some embodiments, the timed video call is initiated only between the first and second user devices. In some embodiments, the timed video is initiated between at least the first and second user devices and a second guest user on a third user device.

In some embodiments, the typed command includes a target field identifying the guest user on the second user device. In some embodiments, the target field includes at least a username. In some embodiments, the typed command includes a field identifying the purpose of the timed video call.

In some embodiments, the first and second unique meeting links are the same link.

In some embodiments, when the communication server transmits over the communication network a lobby interface to be rendered on both the first user device of the host user and the second user device of the guest user, the lobby interface includes a join button. In some embodiments, the lobby interface includes functionality for selecting a camera source and an audio source providing a video stream and an audio stream used within the timed video call.

In some embodiments, a call interface is rendered on the first user device of the host user and the second user device of the guest user only after both the host user on the first user device and the guest user on the second user device have interacted with the join button. In some embodiments, interacting with the join button comprises the host user on the first user device interacting with a join button causing the communication server to render a meeting waiting area interface on the first user device of the host user, the meeting waiting area interface including a leave button and functionality for selecting a camera source and an audio source providing a video stream and an audio stream used within the timed video call. The meeting waiting area interface persists until the guest user on the second user device has also interacted with the join button, or until the expiration of a preconfigured duration of time at which point the meeting expires.

In some embodiments, the rendered call interface includes a leave button and functionality for selecting a camera source and an audio source providing a video stream and an audio stream used within the timed video call. In some embodiments, interacting with the leave button terminates the timed video call. In some embodiments, the call interface includes a host user video window that displays a video stream originating from the first user device and a guest user video window that displays a video stream originating from the second user device. In some embodiments, the call interface includes a timer including a question portion indicator corresponding to a first length of time, and an answer portion indicator corresponding to a second length of time. In some embodiments, the rendered host user video window is sized to encompass a majority of the call interface and the rendered guest user video window is sized to encompass a minority of the call interface during a question portion corresponding to a first length of time on the timer. In some embodiments, the rendered guest user video window is sized to encompass a majority of the call interface and the rendered host user video window is sized to encompass a minority of the call interface during an answer portion corresponding to a second length of time on the timer.

In some embodiments, the social media platform server is the Discord® server.

In another embodiment, a system for a timed video call is disclosed. The timed video call is facilitated by a user account associated with a social media platform server designed to support communication among a defined group of users, the social media platform server being coupled to a communication network. The system comprises a processor and a memory. The memory has executable instructions stored thereon that when executed by the processor cause the processor to receive over the communication network a request from a host user on a first user device to initiate the timed video call with a guest user on a second user device, the timed video call having a predefined duration, the request comprising a typed command following a predetermined syntax. The processor parses the typed command to identify the guest user and second user device and transmits the request over the communication network to an application programming interface of a communication server, wherein transmission of the request causes the application programming interface to transmit over the communication network to the user account a first and second unique meeting link to participate in the timed video call. The processor transmits the first unique meeting link to the first user device and the second unique meeting link to the second user device. A response to at least one of the first or second unique meeting link by at least one of the host user or the guest user is received by the communication server over the communication network. Based at least in part on the received response, the response being configured to redirect the at least host user or the guest user to the communication server which initiates the timed video call to stream video and audio between the first user device and the second user device, the streamed video and audio rendered on a call interface on the first user device and the second user device, the call interface including a timer corresponding to a length of time used in or remaining from the predefined duration of the timed video call. The end of the predefined duration causes the termination of the timed video call by the communication server.

In another embodiment, a computer-implemented method for a timed video call is disclosed. The computer implemented method is performed by a communication server designed to support communication among a defined group of users, the communication server being coupled to a communication network. The method comprises generating a first and second unique meeting link for a host user on a first user device to participate in the timed video call with a guest user on a second user device, in response to communications over the communication network from a user account associated with a social media platform server. The timed video call has a predefined duration. The method further comprises transmitting over the communication network to the user account the first and second unique meeting links, causing the user account to transmit the first unique meeting link to the first user device and the second unique meeting link to the second user device. The method further comprises receiving over the communication network a response to at least one of the first or second unique meeting link by at least one of the host user or the guest user. Based at least in part on the received response, the method further comprises initiating the timed video call to stream video and audio between the first user device and the second user device, the streamed video and audio rendered on a call interface on the first user device and the second user device, the call interface including a timer corresponding to a length of time used in or remaining from the predefined duration of the timed video call. The method ends with terminating the timed video call at the end of the predefined duration.

In another embodiment, a system for a timed video call is disclosed. The timed video call is facilitated by a communication server designed to support communication among a defined group of users, the communication server being coupled to a communication network. The system comprises a processor and a memory. The memory has executable instructions stored thereon that when executed by the processor cause the processor to generate a first and second unique meeting link for a host user on a first user device to participate in the timed video call with a guest user on a second user device, in response to communications over the communication network from a user account associated with a social media platform server. The timed video call has a predefined duration. The processor transmits over the communication network to the user account the first and second unique meeting links, causing the user account to transmit the first unique meeting link to the first user device and the second unique meeting link to the second user device. The processor receives over the communication network a response to at least one of the first or second unique meeting link by at least one of the host user or the guest user. Based at least in part on the received response, the processor initiates the timed video call to stream video and audio between the first user device and the second user device, the streamed video and audio rendered on a call interface on the first user device and the second user device, the call interface including a timer corresponding to a length of time used in or remaining from the predefined duration of the timed video call. The processor terminates the timed video call at the end of the predefined duration.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

The disclosed embodiments are illustrated in the figures of the accompanying drawings which are meant to be exemplary and not limiting, in which like references are intended to refer to like or corresponding parts.

FIG. 36A illustrates a flowchart of a computer-implemented application that provides for a timed one-on-one video conference call according to an embodiment.

DETAILED DESCRIPTION

Figure 1:
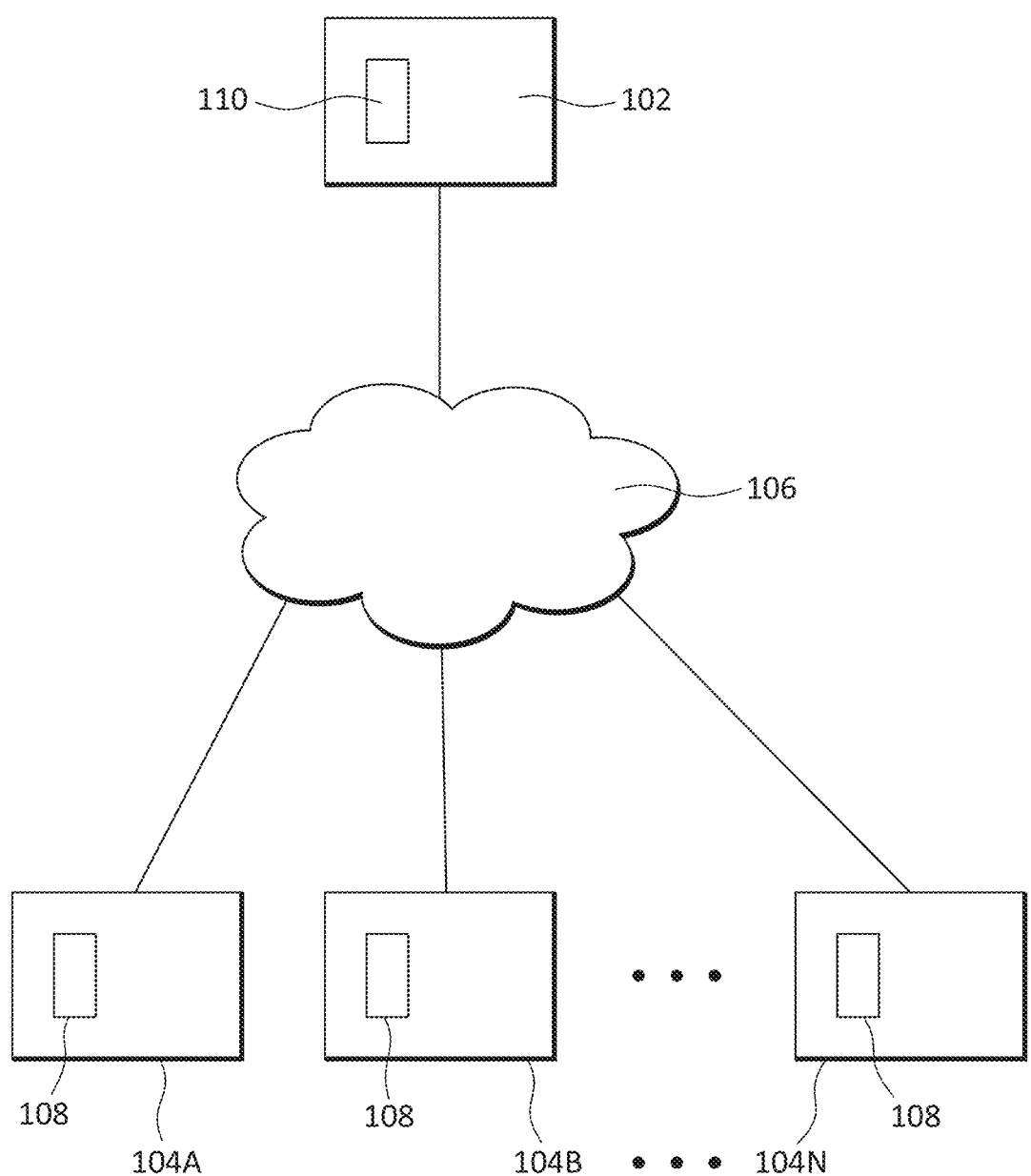
FIG. 1 illustrates an exemplary high-level system architecture for providing a timed one-on-one video conference call according to an embodiment.

Subject matter will now be described more fully hereinafter with reference to the accompanying drawings, which form a part hereof, and which show, by way of illustration, exemplary embodiments. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the disclosed embodiments. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The presently disclosed system and method provides fostering of creative collaboration between two or more people and frees up time (rather than being stuck in never-ending meetings). Most meetings can be wasteful and inefficient. Too many meetings and not enough free time may lead to burnout. Additionally, as remote work has become prevalent, people miss running into colleagues and having spontaneous chats about work or otherwise. Solitude and perpetually open-ended items may cause frustration, low morale, and people quitting their jobs in record numbers.

The present application discloses a system and method for creating short duration video conferences between two or more user devices to provide productivity and collaborative benefits. The disclosed system generates short duration video conferences that allow for quick and concise conversations. The short duration video conferences may guide the participants to an answer or resolution in a relatively short amount of time compared to that of traditional conferences. According to embodiments, the disclosed system may comprise a server configured to host live one-on-one video conferences having a time limit (e.g., 60-seconds) to help encourage more productive conversations, eliminate unnecessary meetings, reclaim people's calendars, and increase the speed of problem-solving. The disclosed one-on-one video conferences may help to replace desk drop-bys, office pop-ins, and other "collision" meetings.

In addition, in some embodiments, a system and method for facilitating a timed video call as applied to use with a social media platform such as Discord® are disclosed. The disclosed method is performed by a user account associated with the social media platform server, which is coupled to a communication network. The method is achieved by connecting the social media platform server with a communication server designed to support communication among a defined group of users. The user account associated with the social media platform server receives and parses a request from a user device to participate in a timed video call with another user device. The user account transmits the request over the communication network to the communication server, which generates a unique meeting link to participate in the timed video call. The communication server transmits the link to the user account, which in turn transmits the link to the user devices participating in the timed video call. Based on the participating user devices' engagement with the link, the communication server initiates the timed video call by rendering a call interface on the user devices and streaming video and audio between the user devices. The call interface includes a timer indicating the length of time remaining from the predefined duration of the call. When the predefined duration ends, the communication server terminates the call.

FIG. 1 presents an exemplary high-level system architecture 100 for providing a timed one-on-one video conference call according to an embodiment disclosed herein. The system architecture 100 comprises a communication server 102 connected to user devices 104A-N by a communication network 106. Each of the user devices 104A-N is capable of implementing a client application 108 for a timed one-on-one video conference call that is limited to a predetermined duration, e.g., 60 seconds. The client application 108 may provide shared interfaces received from the communication server 102 in which video and audio streams are embedded, the video and audio streams originating from the user devices 104A-N. Specifically, video and audio streams may originate from a first user device 104A of a host and from a second user device 104B of a guest, the host and guest participating in a timed one-on-one video conference call over the communication network 106 as implemented by the communication server 102.

The user devices 104A-N may include a smartphone, tablet, laptop, desktop, palmtop, television, or any other computing device configured to execute the functionality described herein. The user devices 104A-N may have output functionality (e.g., display monitor, touchscreen, speaker, etc.) and input functionality (e.g., touchscreen, keyboard, mouse, camera, microphone, etc.). A camera may provide a video stream on each of the user devices 104A-N, and a microphone may provide an audio stream on each of the user devices 104A-N.

The client application 108 may be a timed one-on-one video conference call client application implemented as a native application, web application, or other software forms. In some embodiments, the client application 108 is in the form of a web page, widget, and/or Java, JavaScript, and/or other applet or plug-in that is downloadable to each of the user devices 104A-N and runs in conjunction with a web browser. The client application 108 and the web browser can be part of a single client-server interface; for example, the client application 108 can be implemented as a plugin to the web browser or another framework or operating system. Any other suitable client software architecture, including but not limited to a widget framework and applet technology, can also be employed.

The communication server 102 may be capable of implementing a server side application 110 for a timed one-on-one video conference call that includes sharing interfaces with embedded video and audio streams received from the user devices 104A-N.

The communication server 102 may be embodied as a computer or computers as reasonably known in the art. The communication server 102 may receive and transmit electronic data from various sources, including but not limited to the user devices 104A-N. For example, the communication server 102 may be operable to receive and post or transmit shared interfaces with embedded video and audio streams originating from one or more of the user devices 104 to one or more other ones of the user devices 104. The communication server 102 may further comprise a database that stores data, such as user accounts or registered users, preferences, rules, and queue data.

The server side application 110 may also provide for a conference call timer that enables the differentiation between different portions of a conference call and the determination of a total length of a conference call. The server side application 110 may update the shared interfaces based on the status of the conference call timer.

The user devices 104A-N, via the communication server 102 and/or other devices and servers, may communicate with each other through the communication network 106. Transmissions over the communication network 106 can take place via any media such as standard telephone lines, LAN or WAN links (e.g., T1, T3, 56 kb, X.25), and broadband connections (ISDN, Frame Relay, ATM), wireless links (802.11, Bluetooth, GSM, CDMA, etc.). The communication network 106 can carry TCP/IP protocol communications and HTTP/HTTPS requests made by a web browser, and the connection between clients and servers can be communicated over such TCP/IP networks. The type of communication network is not limited, however, and any suitable network can be used.

More generally, the techniques described herein can be implemented in any suitable hardware or software. If implemented as software, the processes can be executed on a system capable of running one or more custom operating systems or any commercially available operating system. The software can be implemented on a computer, including a processor unit, system memory, and a system bus that interconnects various components, including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions according to the disclosed embodiments by operating on input data and generating output. An apparatus according to the disclosed embodiments can also perform method steps implemented as a particular purpose logic circuitry, including, as an example, a field-programmable gate array (FPGA) or an application-specific integrated circuit (ASIC). Modules can refer to portions of the computer program and/or the processor/special circuitry that implements that functionality.

Processors suitable for executing a computer program include, by way of example, both general and special purpose microprocessors and any one or more processors of any digital computer. Generally, a processor will receive instructions and data from a read-only memory or a random-access memory, or both. The essential elements of a computer are a processor for executing instructions and one or more memory devices for storing instructions and data. Information carriers suitable for embodying computer program instructions and data include all forms on non-volatile memory, including by way of example semiconductor memory devices, e.g., EPROM, EEPROM, and flash memory devices; magnetic disks, e.g., internal hard disks or removable disks; magnetic disks, e.g., internal hard disks or removable disks; magnetic-optical disks; and CD-ROM and DVD-ROM disks. One or more memories can store media assets (e.g., audio, video, graphics, interface elements, and/ or other media files), configuration files, and/or instructions that, when executed by a processor, form the modules, engines, and other components described herein and perform the functionality associated with the components. The processor and the memory can be supplemented by or incorporated in special purpose logic circuitry.

It should also be noted that the present embodiments can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The programs can be further translated into machine language or virtual machine instructions and stored in a program file form. The program file can then be stored on or in one of the articles of manufacture.

Figure 2:
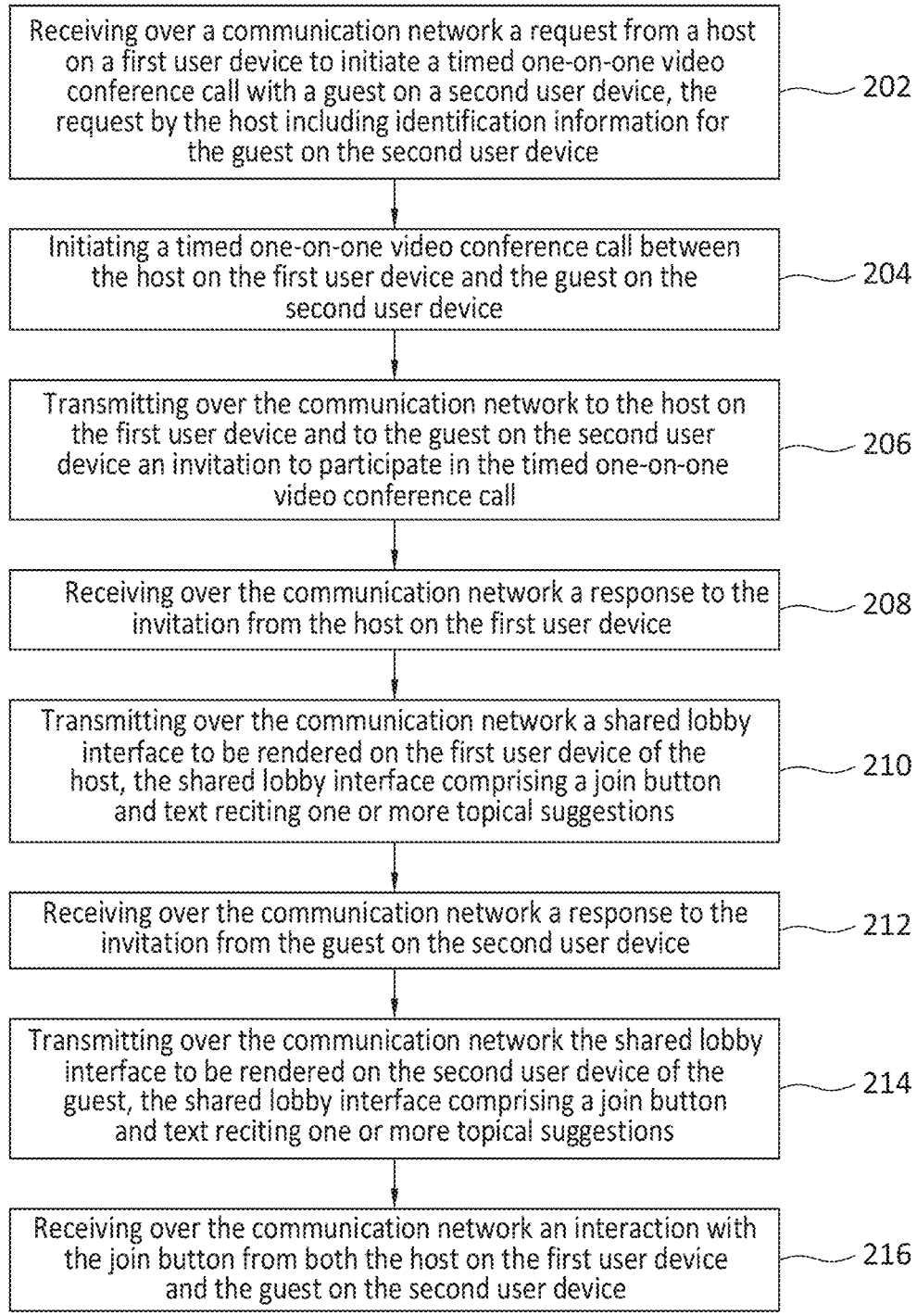
FIG. 2 illustrates a flowchart of a computer-implemented application that provides for a timed one-on-one video conference call according to an embodiment.
Figure 2:
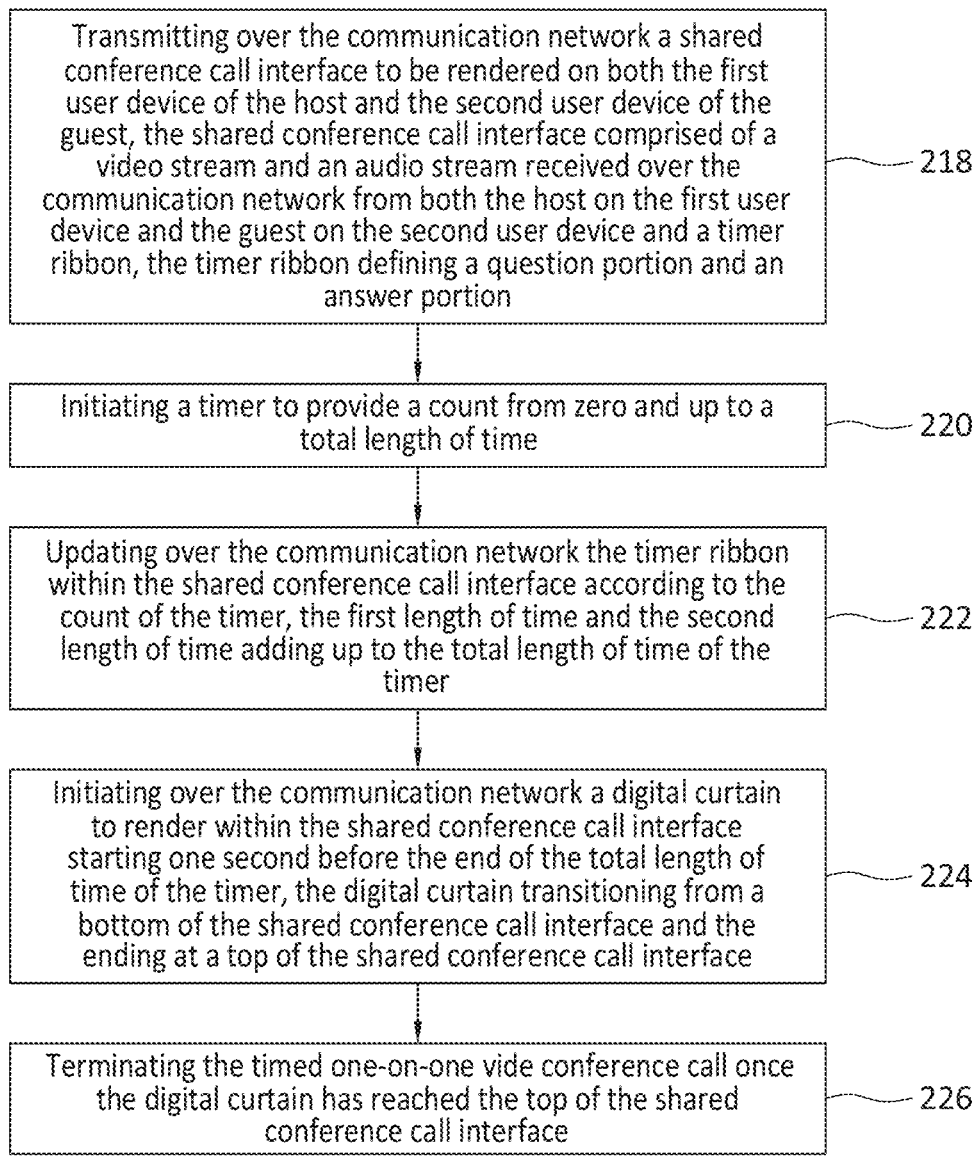

FIG. 2 presents a flowchart of a computer-implemented application that provides for a timed one-on-one video conference call according to an embodiment disclosed herein.

The method 200 begins at step 202 with communication server 102 receiving over a communication network 106 a request from a host on a first user device 104A to initiate a timed one-on-one video conference call with a guest on a second user device 104B, the request by the host may comprise a message including identification information for the guest on the second user device 104B. The identification information of the guest on the second user device 104B may include a name, email address, username, phone number, or any other identifying information reasonably known to one of ordinary skill in the art. The identification information may also have been previously gathered and stored on the database of communication server 102. The request may further include a proposed date and time for scheduling the timed one-on-one video conference call in advance or alternatively, to start as soon as possible (e.g., upon response by the guest). The request may also include configuration settings for the timed one-one-one video conference call, such as a queue that determines an order and time for one or more guests to participate in the timed one-on-one video conference call. Details or information in the request may be parsed for creating the timed one-on-one video conference call. Additionally, one or more data entries may be created for each timed one-on-one video conference call in the database of communication server 102 for managing timed one-on-one video conference call sessions.

According to another embodiment, the host on the first user device 104A may create a timed one-on-one video conference call with a group of guests on user devices 104B-104N. A queue may be created for the group of guests wherein specific time blocks of a queue may be assigned to by the host or selected by guests. The queue may be created as a data object and stored as a record associated with the timed one-on-one video conference call in the database coupled to the communication server 102. The queue may determine an order and time for the guests to speak during the timed one-on-one video conference call.

Queues may be created according to a variety of templates for different queue configurations, or fields that are set based on queue configuration data. The host may select time increments for creating time blocks in the queue based on a total number of guests or desired questions (e.g., 15 minutes=15 guests). Each time block may correspond to individual one-on-one timed video conference call sessions. The host may further configure whether the queue is private or public.

A private queue may comprise one or more single-host-to-single-guest sessions which allows for only the host and one guest to participate in and view the timed one-on-one video conference call at a given time block. A public queue may comprise a single-host-to-many-guests session where all participants are able to view an entirety of the timed one-on-one video conference call but only a designated guest is allowed to carry a dialogue with the host during their assigned time block.

Once the request has been received over the communication network 106 from the host on the first user device 104A, the method 200 continues in step 204 with initiating a timed one-on-one video conference call between the host on the first user device 104A and the guest on the second user device 104B. Prior to initiating the timed one-on-one video conference call, authentication on the communication server 102 of the host on the first user device 104A, the guest on the second user device 104B, or both may be required. This authentication may be implemented on the communication server 102 by any means reasonably known to one of ordinary skill in the art.

Once the timed one-on-one video conference call has been initiated on the communication server 106, the method 200 continues in step 206 with transmitting over the communication network 106 to the host on the first user device 104A and to the guest on the second user device 104B, a link or invitation to participate in the timed one-on-one video conference call. In an exemplary embodiment, the link or invitation may include a link that will link the first user device 104A and the second user device 104B to a corresponding timed one-on-one video conference call referenced in the database of the communication server 102 over the communication network 106 when engaged by the user and the guest. The link may be provided by a "copy to clipboard" feature or sent via email, Short Message Service ("SMS"), or shared by other forms of electronic communications. According to another embodiment, the link or invitation may comprise a calendar invite for scheduling the timed one-on-one video conference call for a later time. The calendar invite may be available via an application programming interface ("API"), and/or through integrations with calendar applications such as Google Calendar and Calendly. For example, functionality for inviting guests to timed one-on-one video conference calls may be integrated into an invite button on a calendar application.

Once the link or invitation has been transmitted over the communication network 106, the method 200 continues in step 208 with receiving over the communication network 106 a response to the link or invitation from the host on the first user device 104A. In an exemplary embodiment, the received response may be in response to the host engaging the link or invitation received on the first user device 104A upon initiating the timed one-on-one video conference call. The response from the host is received over the communication network 106, and the method 200 continues in step 210 with transmitting over the communication network 106 a shared lobby interface to be rendered on the first user device 104A of the host, the shared lobby interface comprising a join button and text reciting one or more topical suggestions. The one or more topical suggestions may be selected randomly from a plurality of topical suggestions stored on the communication server 102, each of the plurality of topical suggestions relating to time management, productivity, or work-related suggestions. Alternatively, the topical suggestions may be entered by the host from the first user device 104A.

The method 200 continues in step 212 with receiving over the communication network 106 a response to the link or invitation from the guest on the second user device 104B. In an exemplary embodiment, the received responses may be in response to the guest engaging a link included in the invitation received on the second user device 104B. According to one embodiment, the link to the timed one-on-one video conference call may be sent to a plurality of guests, and each guest receiving the link may select the link to be placed into a queue block. Guest may select their time preference and are added to the queue.

Once the response from the guest has been received over the communication network 106, the method 200 continues in step 214 with transmitting over the communication network 106 a shared lobby interface to be rendered on the second user device 104B of the guest, the shared lobby interface comprising a join button and text reciting one or more topical suggestions. According certain embodiments, the response from the guest may be forwarded as a queue request for approval by the host. The queue request may comprise a request to be added to a queue for a timed one-on-one video conference call. The host may approve or deny the request was well as add or remove guests from the queue. Guests that are approved may proceed to render the shared lobby interface on the second user device 104B of the guest. Guests that are denied may not proceed to render the shared lobby interface. Other moderation/validation steps may also be taken before allowing guests to join a timed one-on-one video conference call with the host. The host may also be able to limit queue or timed one-on-one video conference call access at a designated time.

The method 200 continues in step 216 with receiving over the communication network 106, an interaction with the join button from both the host on the first user device 104A and the guest on the second user device 104B. The join button provides a means for the host on the first user device 104A and the guest on the second user device 104B to interact with the communication server 102 from within the shared lobby interface. An interaction by the host or the guest with the communication server 102 using the join button signals over the communication network 106 their respective participation in the timed one-on-one video conference call.

According to one embodiment, the timed one-on-one video conference call may be used in a given company environment or setting, or the host and the guest may share a common affiliation e.g., employees or members of a given company or association. As such, the shared lobby interface may be customized with the name and/or logo of a company or association. The communication server 102 may be provided with data access to enterprise/productivity software via an API and retrieve user account information associated with the host and/or guest. Additionally, the shared lobby interface may include the names of host and guest. For example, the host may be presented with a caption indicating a timed one-on-one video conference call with the name of the guest and a topic, and conversely, the guest may be presented with a caption indicating a timed one-on-one video conference call with the name of the host and the topic.

The shared lobby interface also provides for the selection of a video source and an audio source on each of the user devices 102A-N. Specifically, the shared lobby interface provides for the host to select a camera source and an audio source on the first user device 104A that will provide for a video stream and an audio stream to be used within the timed one-on-one video conference call. Similarly, the shared lobby interface allows the guest to select a camera source and an audio source on the second user device 104B that will provide for a video stream and an audio stream to be used within the timed one-on-one video conference call.

Once an interaction with the join button is received over the communication network 106 from both the host and the guest (or one or more guests), the method 200 continues in step 218 with transmitting over the communication network 106 a shared conference call interface to be rendered on both the first user device 104A of the host and the second user device 104B of the guest to begin the timed one-on-one video conference call. Alternatively, the timed one-on-one video conference call may begin at a scheduled time and date. The shared conference call interface may comprise a video stream and an audio stream received over the communication network 106 from both the host on the first user device 104A and the guest on the second user device 104B and a timer ribbon, the timer ribbon defining a question portion and an answer portion. Each of the question and answer portions of the timer ribbon may be assigned to a host or guest. For example, a host initiating a timed one-on-one video conference call to ask a guest a question may be assigned the question portion of the timer ribbon. According to another embodiment, a host may be assigned to the answer portion of the timer ribbon when the host initiates timed one-on-one video conference calls with guests from a queue (e.g., host takes part in answering questions from one or more guests). For multiple guests, additional invited guests may continue to join the timed one-on-one video conference call as the queue block is progressed through.

The method 200 continues in step 220 with initiating a timer to provide a count from zero and up to a total length of time. The timer may serve as an indication of remaining time left for the timed one-on-one video conference call before a termination of the timed one-on-one video conference call. The duration of the timed one-on-one video conference call may be preconfigured for a specific duration of time, e.g., 60 seconds, two minutes, etc.

Once the timer has started, the method 200 continues in step 222 with updating over the communication network 106 the timer ribbon within the shared conference call interface according to the count of the timer, the timer ribbon indicating a question period for a first length of time and an answer period for a second length of time, the first length of time and the second length of time adding up to the total length of time of the timer.

The method 200 continues in step 224 with initiating over the communication network 106 a digital curtain to render within the shared conference call interface starting at the end of the total length of time of the timer, the digital curtain transitioning from a bottom of the shared conference call interface and the ending at a top of the shared conference call interface.

The method 200 ends in step 226 with terminating the timed one-on-one video conference call once the digital curtain has reached the top of the shared conference call interface. At the end of the timed one-on-one video conference call, a series of questions may be asked of participants to gauge how their user experience was. For example, participants may be asked how was their call quality, what did they love about the timed one-on-one video conference call and/or interface, what was annoying, what was confusing, what did they feel was missing, what did they use the timed one-on-one video conference call for, and generally how may their experience be improved.

Figure 3:
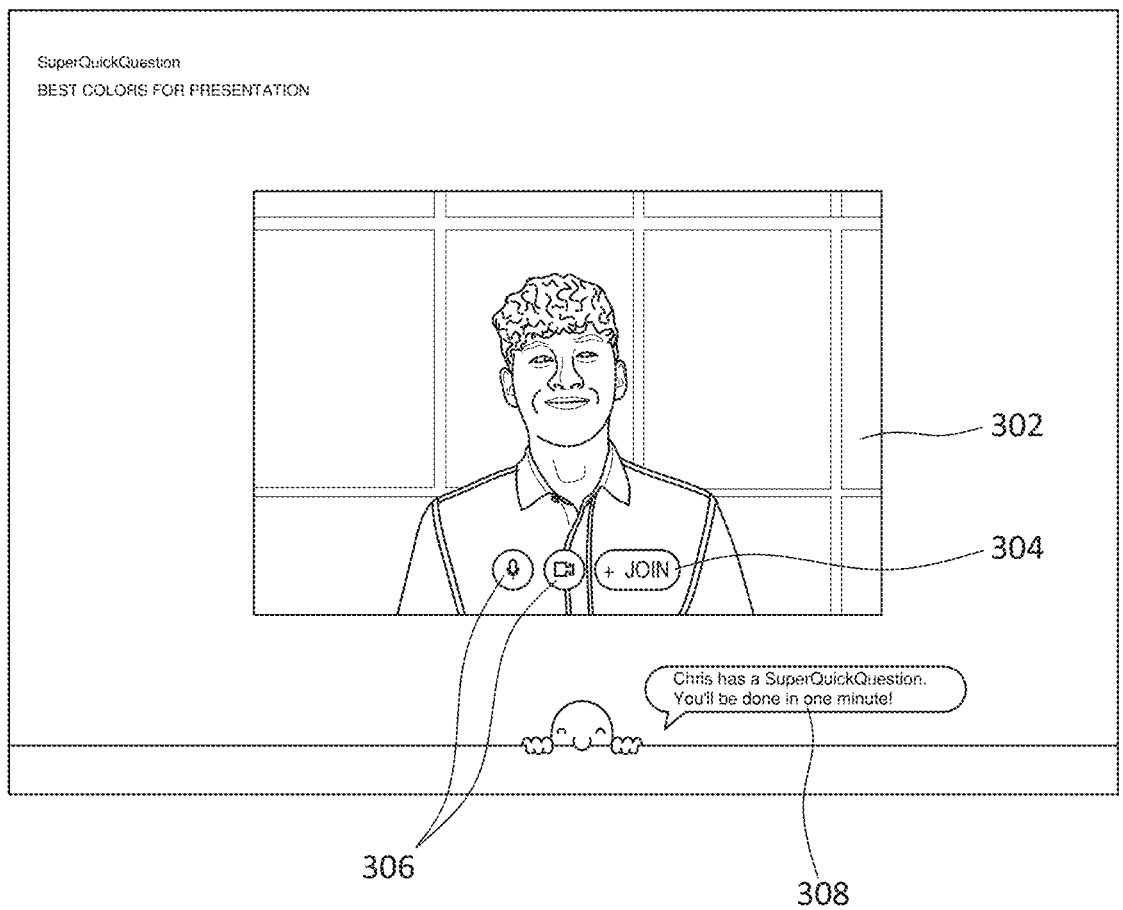
FIG. 3 illustrates an exemplary shared lobby interface for a timed one-on-one video conference call according to an embodiment.

FIG. 3 presents an exemplary shared lobby interface 300 for a timed one-on-one video conference call according to an embodiment disclosed herein. The shared lobby interface 300 may include a video window 302, a join button 304, video and audio source buttons 306, and text reciting one or more topical suggestions 308.

The video window 302 may display a video stream originating from either the first user device 102A, a video stream originating from the second user device 102B, or a predetermined image file.

As discussed above, the join button 304 may provide for interaction over the communication network 106 by the host on the first user device 102A or the guest on the second user device 102B with the communication server 102 signaling their respective participation in the timed one-on-one video conference call.

The video and audio source buttons 306 provided for selecting a video source and an audio source on the first user device 102A and the second user device 102B. The text reciting one or more topical suggestions 308 may be selected from a plurality of topical suggestions stored on the communication server 102 or entered by the host on the first user device 102A.

Figure 4:
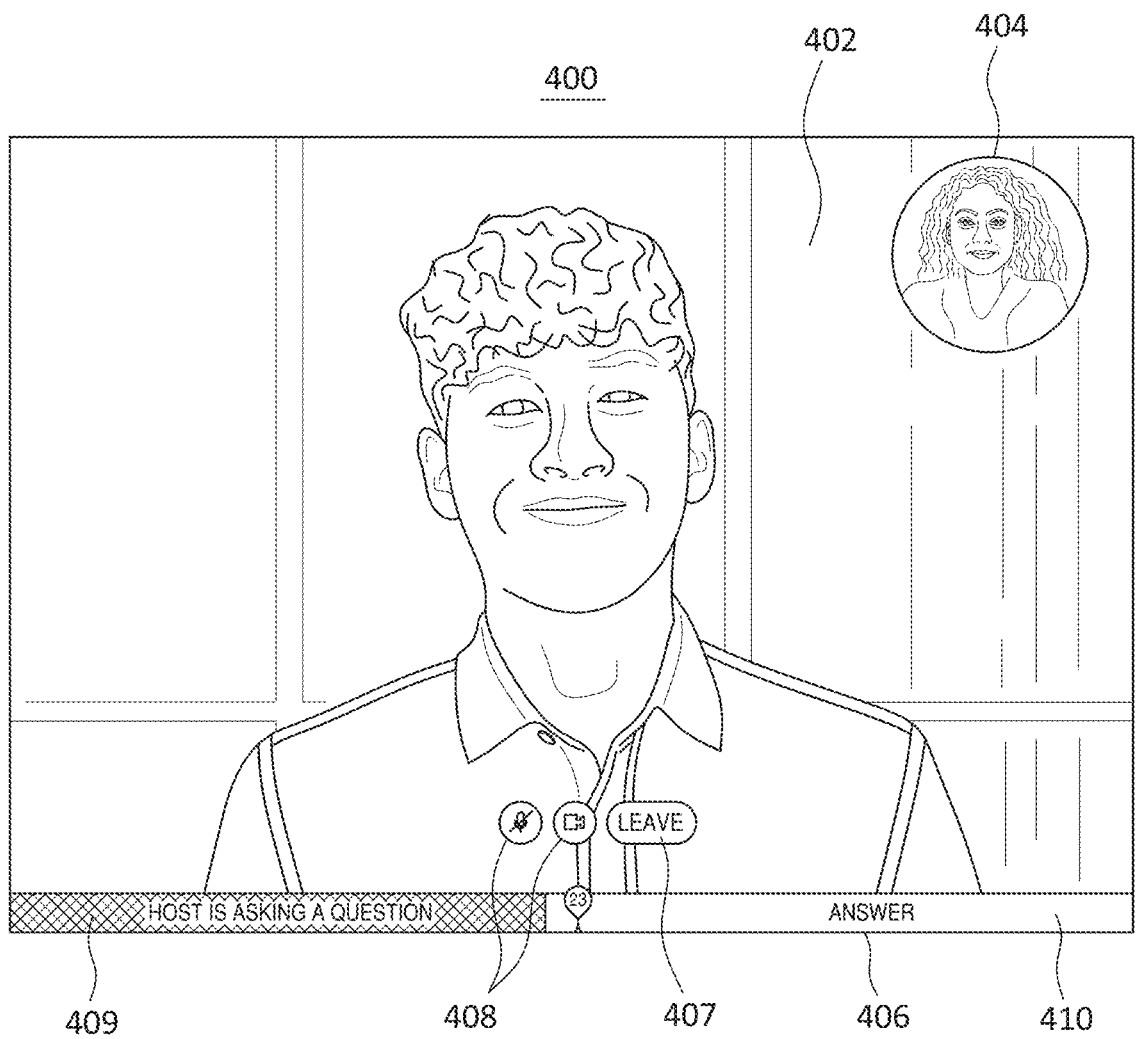
FIG. 4 illustrates an exemplary shared conference call interface for a timed one-on-one video conference call according to an embodiment.

FIG. 4 presents an exemplary shared conference call interface 400 for a timed one-on-one video conference call according to an embodiment disclosed herein. The shared conference call interface 400 may include a host video window 402, a guest video window 404, a timer ribbon 406, a leave button 407, and video and audio source buttons 408.

The host video window 402 displays the video stream and plays the audio stream originating from the first user device 102A of the host. Similarly, the guest video window 404 displays the video stream and plays the audio stream originating from the second user device 102B of the guest.

The timer ribbon 406 provides a visual display of the timer count up to a total length of time. The timer ribbon 406 may be divided into a question portion 409 and an answer portion 410. While the timer is in the question portion 409, the host video window 402 may be sized to encompass the majority of the shared conference call interface 400 while the guest video window 404 may be sized to encompass a minority of the shared conference call interface 400. Alternatively, while the timer is in the answer portion 410, the guest video window 404 may be sized to encompass the majority of the shared conference call interface 400 while the host video window 402 may be sized to encompass a minority of the shared conference call interface 400.

The leave button 407 may provide for interaction over the communication network 106 by the host on the first user device 102A or the guest on the second user device 102B with the communication server 102 signaling their respective termination of the timed one-on-one video conference call.

As described above, the video and audio source buttons 408 provide for selecting a video source and an audio source on each of the first user device 102A and the second user device 102B.

Figure 5:
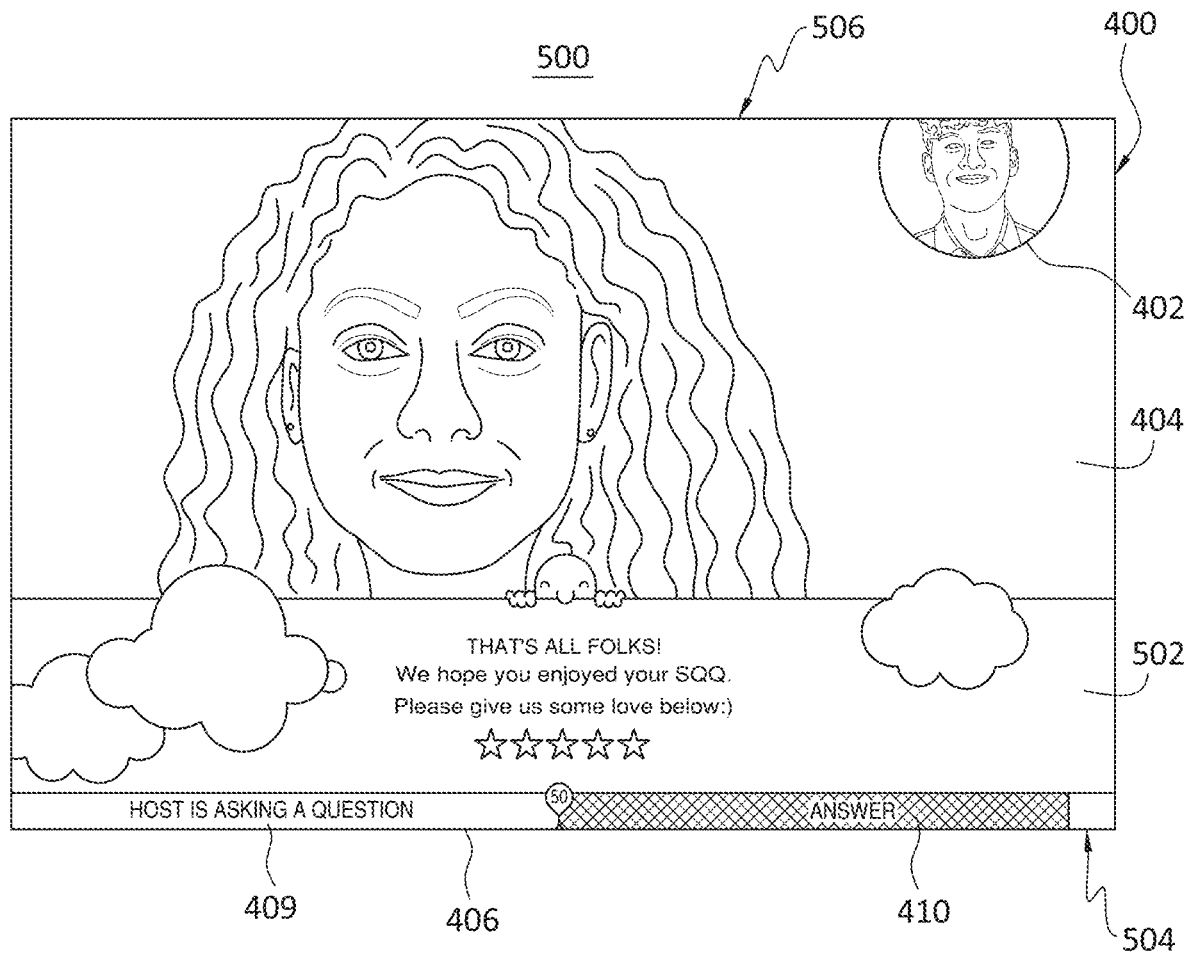
FIG. 5 illustrates an exemplary digital curtain within a shared conference call interface for a timed one-on-one video conference call according to an embodiment.

FIG. 5 presents an exemplary digital curtain 502 within a shared conference call interface 400 for a timed one-on-one video conference call according to an embodiment disclosed herein. The digital curtain 502 begins a transition from a bottom portion 504 of the shared conference call interface 400 to a top portion 506 of the shared conference call interface 400. The transition begins at the end of the answer portion 410 of the timer ribbon 406.

Figure 6:
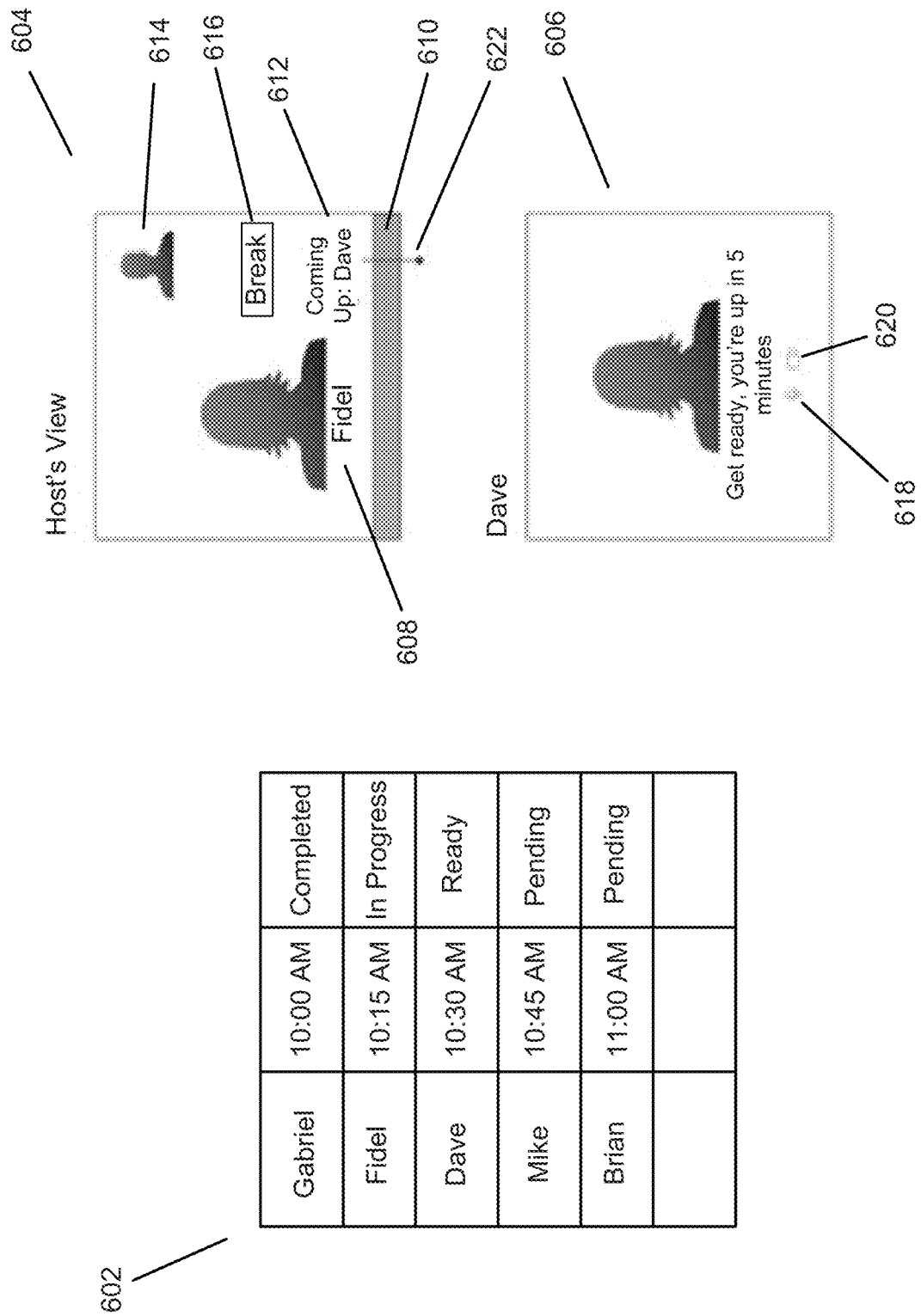
FIG. 6 illustrates an exemplary queue for a timed one-on-one video conference call according to an embodiment.

FIG. 6 presents an exemplary queue for a timed one-on-one video conference call according to an embodiment. Guests may be placed into a scheduled queue 602 for a timed one-on-one video conference call including a plurality of guests. In one embodiment, the guest may select their time preference and are added to the queue based on their selection. In another embodiment, the guest may be added to the queue 602 in a next available time slot or sequence after a previous guest that was added to the queue 602.

Host's view 604 includes video streams originating from a host 614 and from a current guest 608 corresponding to a current queue block that is in progress. The host's view 604 further includes a timer 610 indicating a total time and time elapsed/remaining 622 in the current queue block and indication 612 of a next guest that is ready in a next queue block. Break 616 may allow the host to initiate a break session.

During the current queue block, the next guest may be presented with a next guest's view 606 indicating that they are coming up next in a given time. The next guest may also select an audio source 618 and a camera source 620 on their user device that will provide for a video stream and an audio stream to be used within the timed one-on-one video conference call.

The presently disclosed timed one-on-one video conference call may be used for achieving various tasks or functionalities for a company. According to one embodiment, timed one-on-one video conference calls may be used as an internal workplace communication tool to eliminate unnecessary meetings and help save companies time and money. Timed one-on-one video conference calls may be integrated with business communication platforms, such as Slack and Microsoft Teams.

Figure 7:
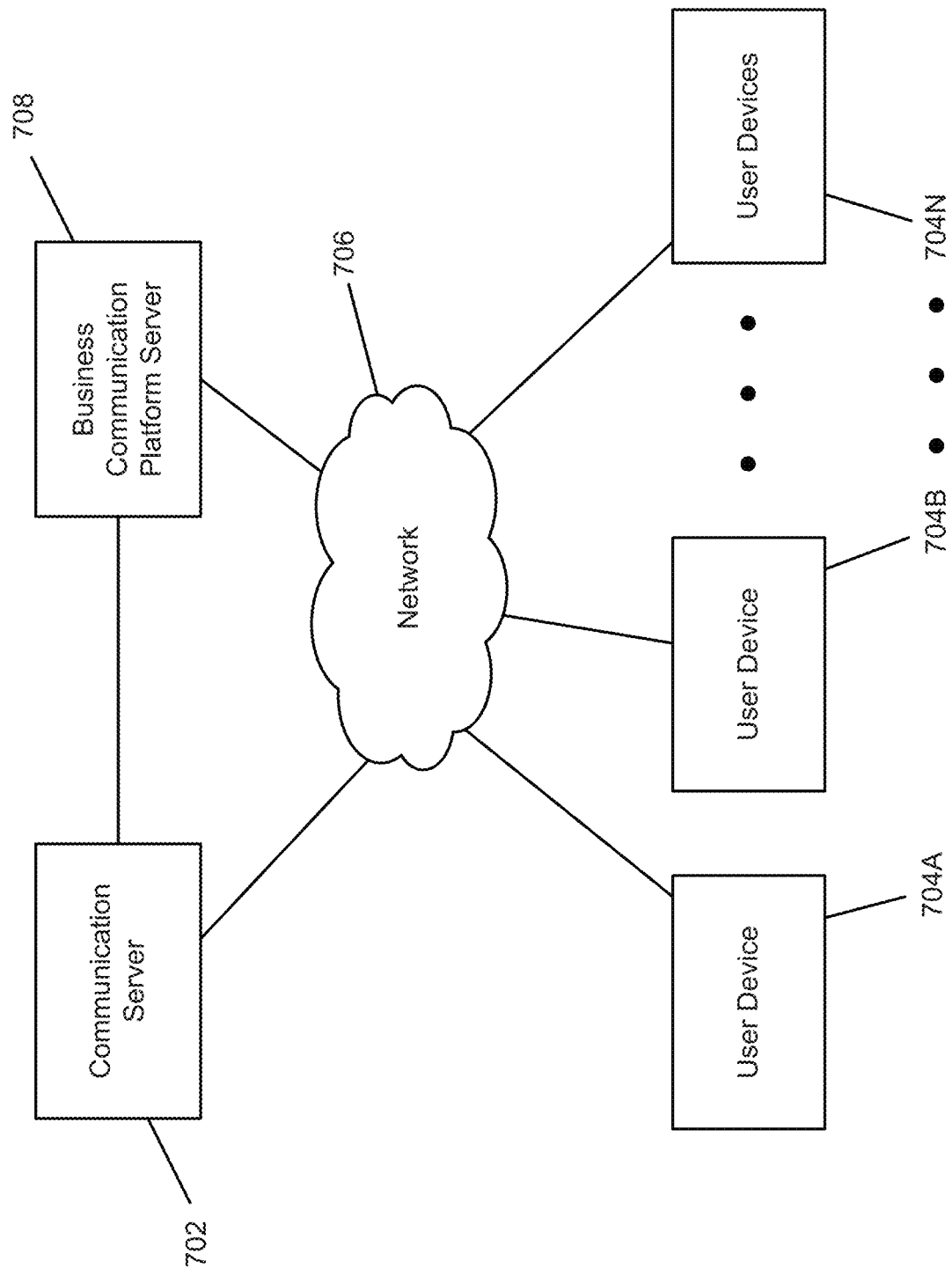
FIG. 7 illustrates an exemplary computing system for providing a timed one-on-one video conference call according to an embodiment.

FIG. 7 presents an exemplary computing system for providing a timed one-on-one video conference call according to an embodiment. User devices 704A-N may include a smartphone, tablet, laptop, desktop, television, personal digital assistants (PDA), e-book readers, smart watches and smart wearable devices, or any computing device having a central processing unit and memory unit capable of connecting to a network and configured to execute the functionality described herein. The user devices 704A-N may access communication and/or productivity tools (e.g., email, chat, calendar, contacts, etc.) provided by business communication platform server 708 via a communication network 706. The communication tools may comprise cloud computing software-as-a-service ("SAAS") accessible by user devices 704A-N through client applications or web browser clients.

The communication tools may be integrated with a feature for creating and joining timed one-on-one video conference calls. The integration may comprise an API connection between communication server 702 and business communication platform server 708. Each of the user devices 704A-N is capable of initiating and requesting a timed one-on-one video conference call with another one of the user devices 704A-N by sending links through the communication tools. The links may comprise software code or instructions for directing a host on a first user device 704A and one or more guests on second ones of user devices 704B-N to a communication connection with communication server 702.

The links may further instruct the communication server 702 to receive and transmit electronic data from various sources, including but not limited to the user devices 704A-N. For example, the communication server 702 may be operable to receive and post or transmit video and audio streams originating from the user devices 704A-N. The communication server 702 may create a timed one-on-one video conference call session between the first user device 704A and second ones of user devices 704B-N and populate a video call interface that is rendered on the first user device 704A and the second ones of user devices 704B-N with the received video and audio streams. The video call interface may comprise an application, web application, or other software executing on the user devices 704A-N. The communication server 702 may further retrieve user information (e.g., name, company, affiliation, etc.) associated with the user devices 704A-N from business communication platform server 708 and populate the video call interface with the retrieved user information.

The communication server 702 may maintain a conference call timer that limits the timed one-on-one video conference call to a predetermined amount of time, e.g., 60 seconds. The conference call timer may include different portions of a conference call and the determination of a total length of a conference call. The video call interface may further display the conference call timer based on the status of the conference call timer. According to one embodiment, the video call interface may also include a queue and display an indication of one or more other ones of user devices 704N corresponding to one or more time blocks of the queue.

Network 706 may be any suitable type of network allowing transport of data communications across thereof. The network 706 may couple devices so that communications may be exchanged, such as between servers and user devices or other types of devices, including between wireless devices coupled via a wireless network, for example. Network 706 may also include mass storage, such as network attached storage (NAS), a storage area network (SAN), cloud computing and storage, or other forms of computer or machine readable media, for example. In one embodiment, the network 706 may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from user devices may be encrypted using, for example, the Advanced Encryption Standard (AES) with a 128, 192, or 256-bit key size, or any other encryption standard known in the art.

In certain embodiments, a timed one-on-one video conference call may be generated with a type or purpose field which may be provided in a request to initiate the timed one-on-one video conference call. The type or purpose field may be used to show the host and guest on a call interface the nature of the call as well as configure certain settings of the timed one-on-one video conference call, such as length, privacy settings etc. In one embodiment, a timed one-on-one video conference call may be used for sales, such as delivering an "elevator pitch." In another embodiment, a timed one-on-one video conference call may be used by human resources and management for checking in with staff to facilitate regular contact with an entire department without over-scheduling to the point of being counter-productive. In yet another embodiment, a timed one-on-one video conference call may be used for project management to provide brief reports on project statuses so that a team and management may maintain constant visibility on a project without having to be involved on a granular level. Additionally, a timed one-on-one video conference call may be used for design and marketing to allow stakeholders to critique a project to make sure it's heading in the right creative or editorial direction. Timed one-on-one video conference calls may also be used by the medical community, such as for doctor-to-doctor consultations. In certain embodiments, timed one-on-one video conference calls including a plurality of participants may also be split into separate sessions comprising breakout rooms. That is, a current timed one-on-one video conference call may fork into a plurality of new sessions. The communication server 702 may dynamically generate the new sessions based on one or more parameters of the current timed one timed one-on-one video conference call and assign participants (e.g., host and guests) from the timed one-on-one video conference call to each of the new sessions. Participants for each of the breakout rooms may be chosen randomly or by a host.

As disclosed herewith, timed one-on-one video conference calls may provide productivity and collaborative benefits. According to one embodiment, as a way to incentivize use and adoption, users may be awarded points or gift cards for each successfully completed timed one-on-one video conference call to drive more company level adoption of timed one-on-one video conference calls. In order to collect and redeem points, users may be required to create an account with a server associated with hosting the timed one-on-one video conference calls. Activities and earned points (at a company, partner, and individual level) may be aggregated to a unique ID. Examples of actions that may reward users include replacing five meetings with timed one-on-one video conference calls, having a timed one-on-one video conference call with newest team members (new hires feel welcome), entering a competition to see who can use timed one-on-one video conference calls the most (e.g., save most time in a week by replacing meetings and emails with timed one-on-one video conference calls), having timed one-on-one video conference calls with a certain number of difference co-workers by staying connected when remote working (e.g., choosing colleagues that the user hasn't spoken to in a while).

The disclosed timed one-on-one video conference calls may also be integrated within third-party platforms and websites. Examples include sports betting websites, dating websites, financial services platforms, educational technology platform, and retail brand websites.

Traditional dating websites offer users chat features in which they can engage in text conversations via the web or mobile app. By integrating timed one-on-one video conference call technology to these dating websites, users can engage in a brief video conversation with no commitment or exchange of private information. For example, a timed one-on-one video conference call may be initiated with the topic of "Dave, in 15 seconds make your best first impression" followed by "Now Scarlet, your turn. You have 15 seconds to shine." The timed one-on-one video conference calls may be used to bridge the gap between texting and an in-person date.

Sports betting websites may be integrated with a widget through which fantasy sports and betting experts may offer timed one-on-one video conference calls to premium subscribers. For example, users can ask an expert who they should start at running back or what he thinks the line of the Monday night game will be if a certain player remains sidelined due to injury.

Timed one-on-one video conference calls may also be used to provide financial advice to newsletter subscribers or users of investment tools. Auctions and transactions may also be conducted through timed one-on-one video conference calls for buying/selling non-fungible tokens, traditional sports cards, fine wine, art, etc.

Makeup and beauty companies may also use timed one-on-one video conference calls to offer free services, such as matching users of with their proper color palette. For example, brand customers can call a beauty expert with two different shades of eye shadow and ask which one is more complimentary or appropriate for the occasion. Similarly, dieticians and fitness experts may provide health-related advice and tips, such as correct eating and exercise, through timed one-on-one video conference calls.

Timed one-on-one video conference calls can also be used in an academic setting, such as for lectures or office hours, and in town hall meetings. Users may be provided with a public link where they can reserve a timed one-on-one video conference call. For example, a professor wants to dedicate an hour of his calendar to answer questions about topic X. The professor may reserve and publish a timed one-on-one video conference call link. The professor can define how much time he/she is going to be talking about topic X, and the rest of the time may be allocated for questions from students (e.g., a minute each question). Students can register for the timed one-on-one video conference call without having to actively participate and merely watch. When it is time to ask questions during the timed one-on-one video conference call, student may request to speak, and the professor can give them the ability to ask a question (e.g., enable microphone for the student). Similarly, politicians can invite their constituents to hear an address and then can offer a number of timed one-on-one video conference calls to those with questions.

Figure 8:
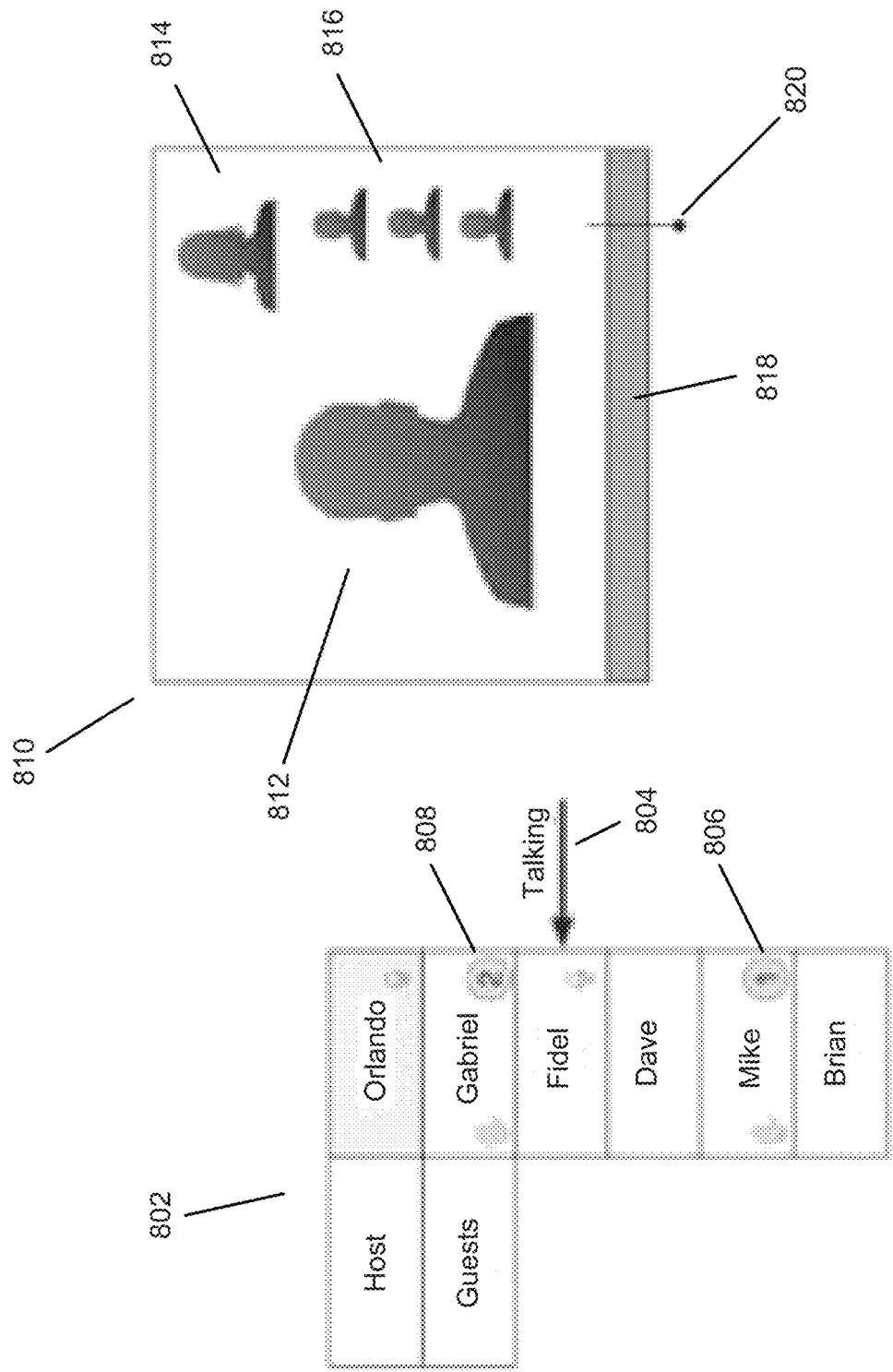
FIG. 8 illustrates an exemplary open forum feature for a timed one-on-one video conference call according to an embodiment.
Figure 9:
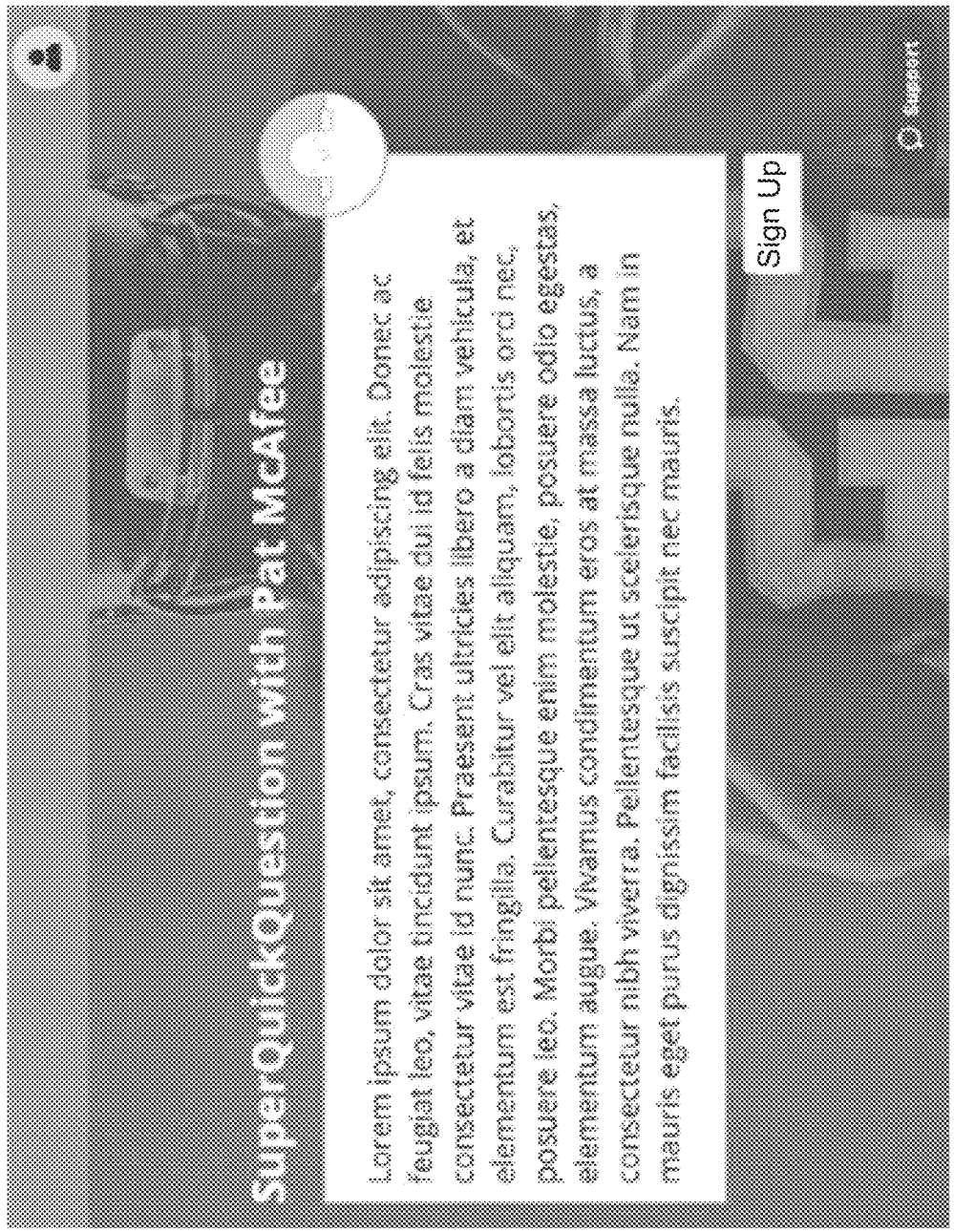
FIGS. 9 through 15 illustrate an exemplary website integrated with timed one-on-one video conference calls according to an embodiment.

FIG. 8 presents an exemplary open forum feature for a timed one-on-one video conference call according to an embodiment. A host may configure a timed one-on-one video conference call to allow for the host to give a talk and then open up the call to questions from an audience. Guests may be placed into a queue 802 for the timed one-on-one video conference call by entering, e.g., a "raise hand" request. A guest at the top of the queue 802 may be granted the ability to speak (804) in the timed one-on-one video conference call for a given duration, as indicated by timer 818 and time elapsed/remaining 820. The ability to speak may be given from guest to guest. A next speaking guest (806) on the queue 802 may be allowed to speak after the given duration for the current speaking guest has expired. A further speaking guest (808) may be allowed to speak after the speaking guest (806). A host's view 810 includes video streams originating from a host 814 and from a current guest 812 corresponding to a current speaking guest. Pending speaking guests 816 are also presented alongside the current guest 812.

Other examples for implementing timed one-on-one video conference calls may include customer service questions for quick questions and answers. Timed one-on-one video conference calls may also be used for "suggestion boxes" where participants may remain anonymous, or for surveys, e.g., to win a gift card, etc. According to another embodiment, timed one-on-one video conference calls may also be "gamified," e.g., challenges, such as "Can You Do This in 60 Seconds?" betting, such as "Think You Can Do This in a Minute?"

FIGS. 9 through 15 present an exemplary website integrated with timed one-on-one video conference calls according to an embodiment. The website presented in FIG. 9 may comprise a sports betting or fantasy sports contest website. The website may host events that may be offered to members for soliciting advice from experts by participating in timed one-on-one video conference calls with the experts. The website includes information about the events and functionality to sign up for the events.

Figure 10:
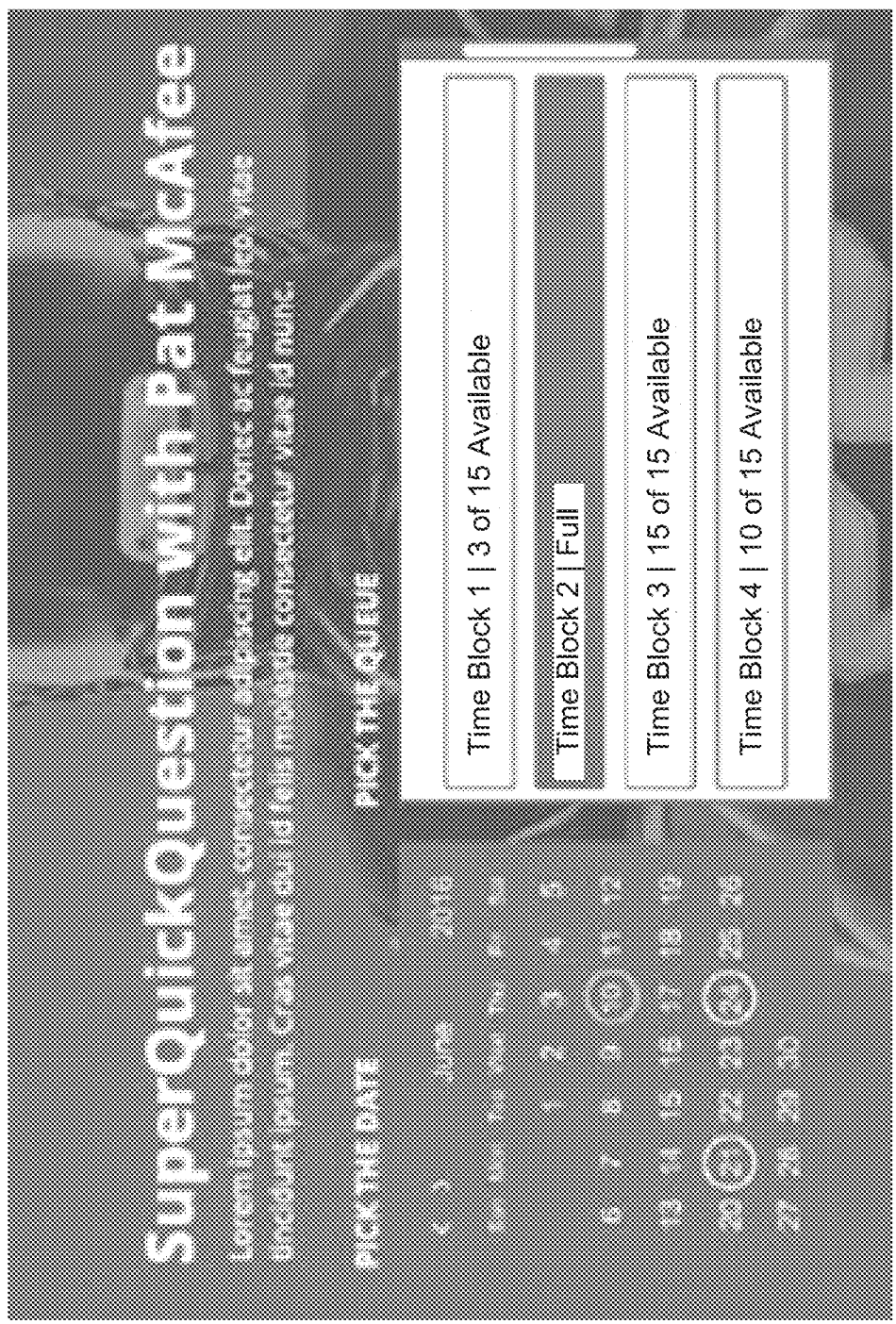
Figure 11:
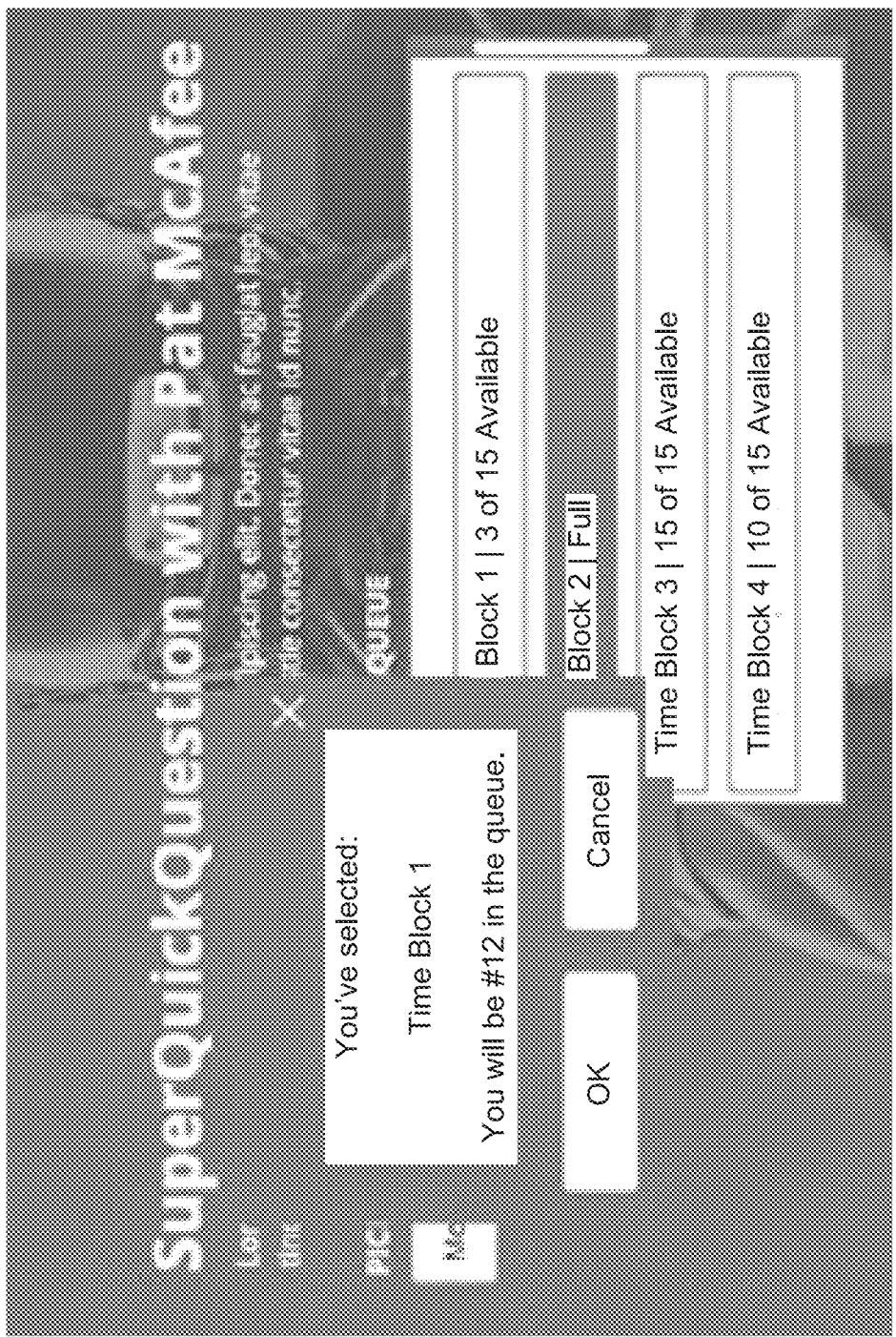

The event may be offered on one or more days, as illustrated in FIG. 10. A member may select a date from a calendar showing dates of when the events are scheduled. Upon selecting a date, the user may also select an available time slot in a queue for that date. Alternatively, a time slot may be automatically assigned to the user and the user need only to select from dates via a drop-down menu. Each of the time slots in the queue may correspond to individual timed one-on-one video conference call sessions during the event. When the user selects a date/queue, a pop-up window may be presented confirming their selection indicating their spot for the event (FIG. 11).

Figure 12:
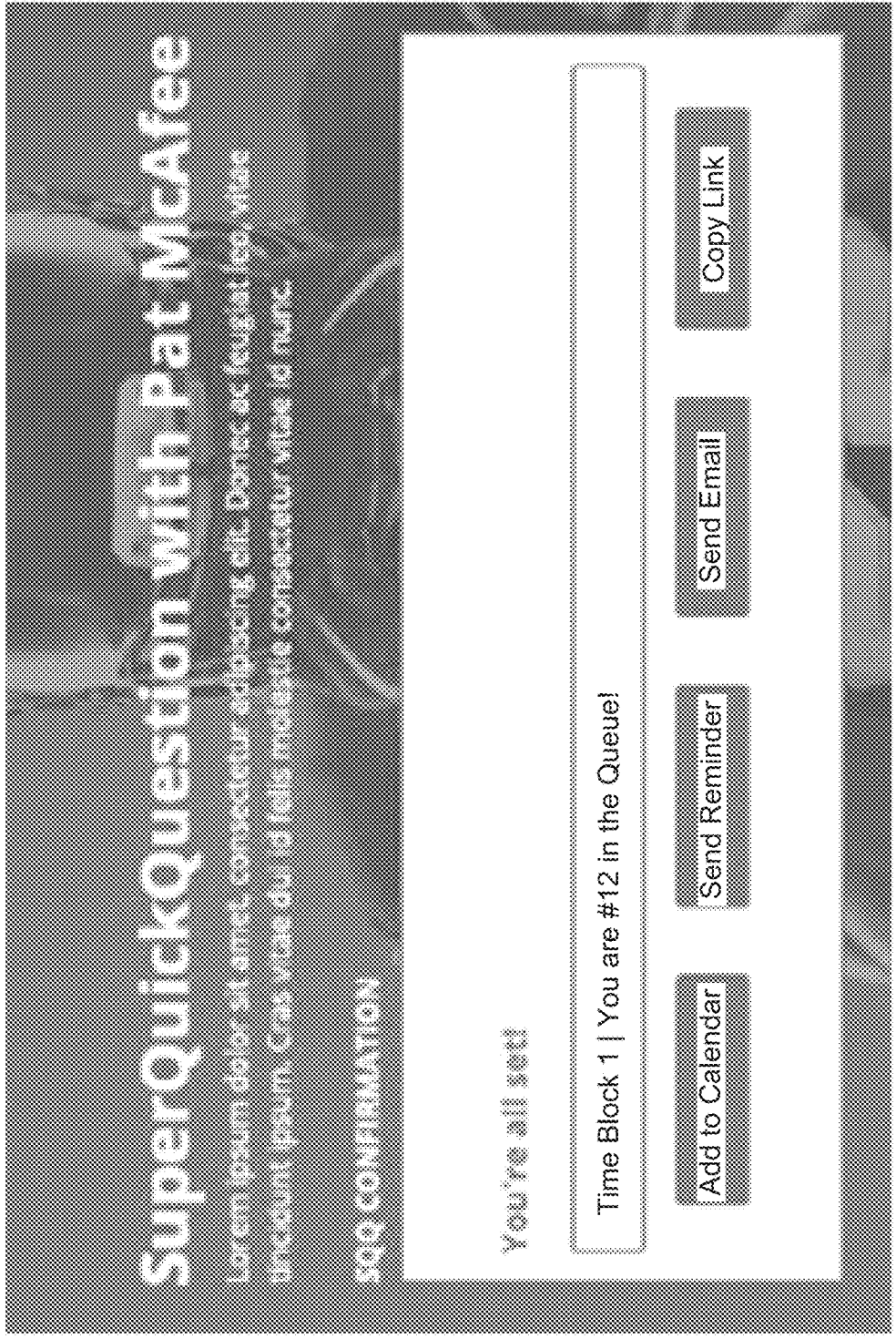

A confirmation page, as illustrated in FIG. 12, may also be presented to the user displaying the information about their selected/scheduled queue with ways for the user to be reminded/notified when it's time to participate in the timed one-on-one video conference call. The user may access a page for the scheduled timed one-on-one video conference call via a link generated on the confirmation page.

Figure 13:
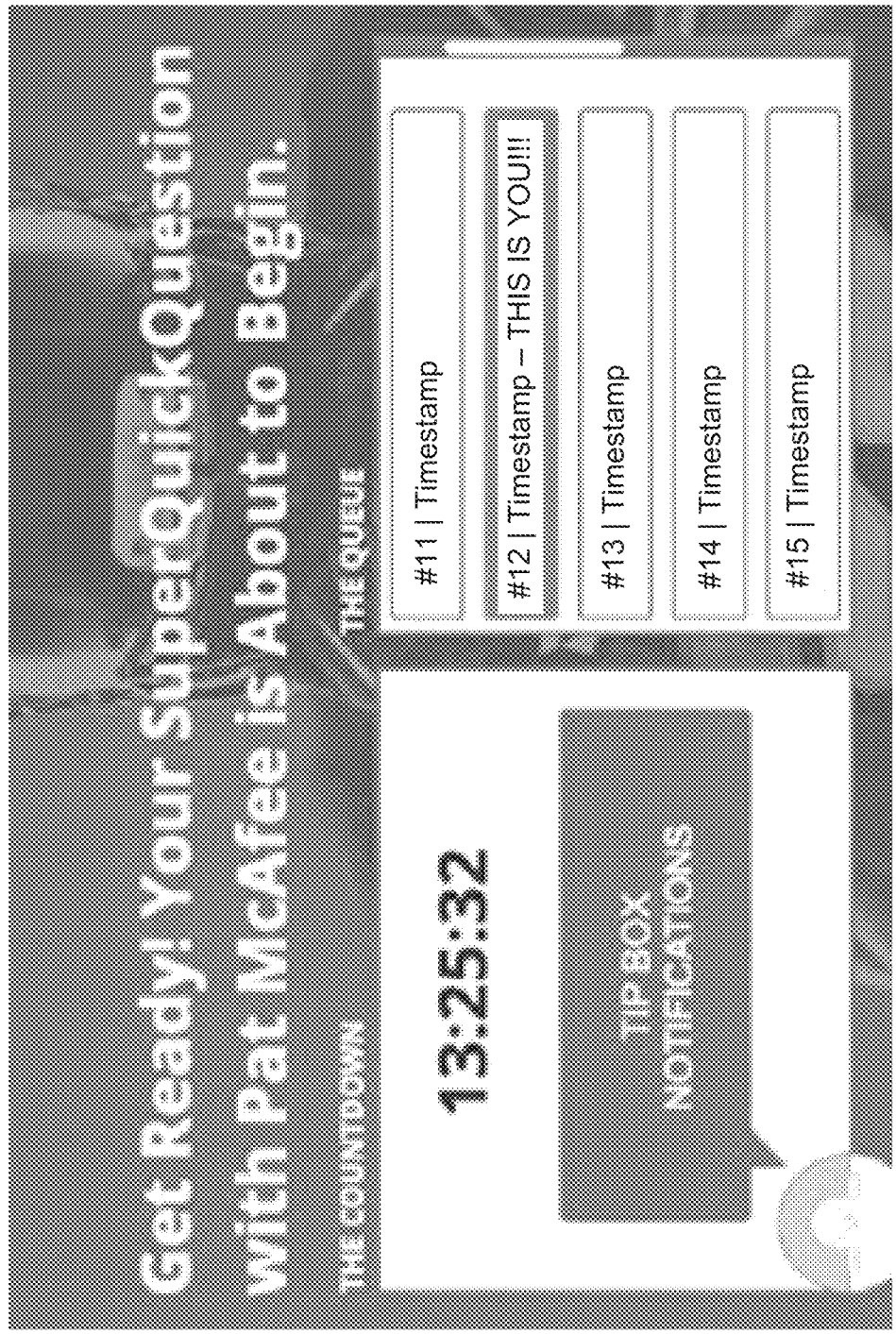

FIG. 13 presents an exemplary preview page of the timed one-on-one video conference call prior to the start of the event. The preview page includes a countdown clock with messages/content for the user to consume while they wait for their turn. An event queue may be displayed with colorful indicators/animations bringing attention to their placement in the queue.

Figure 14:
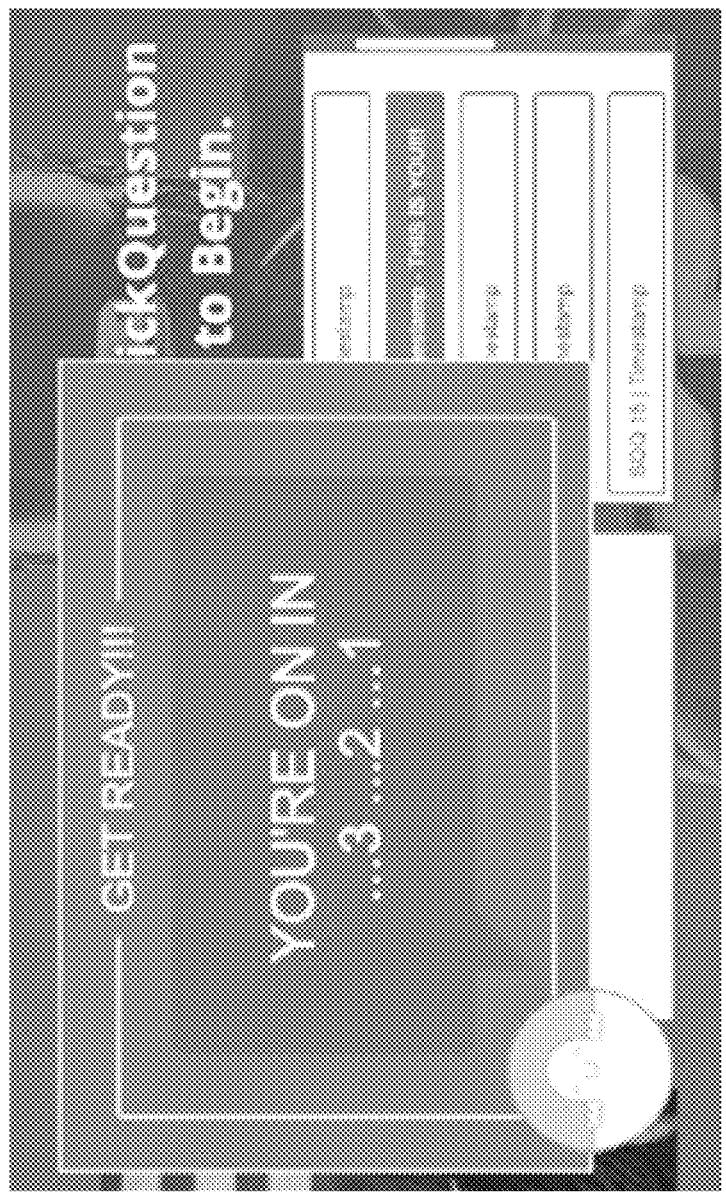
Figure 15:
Figure 16:
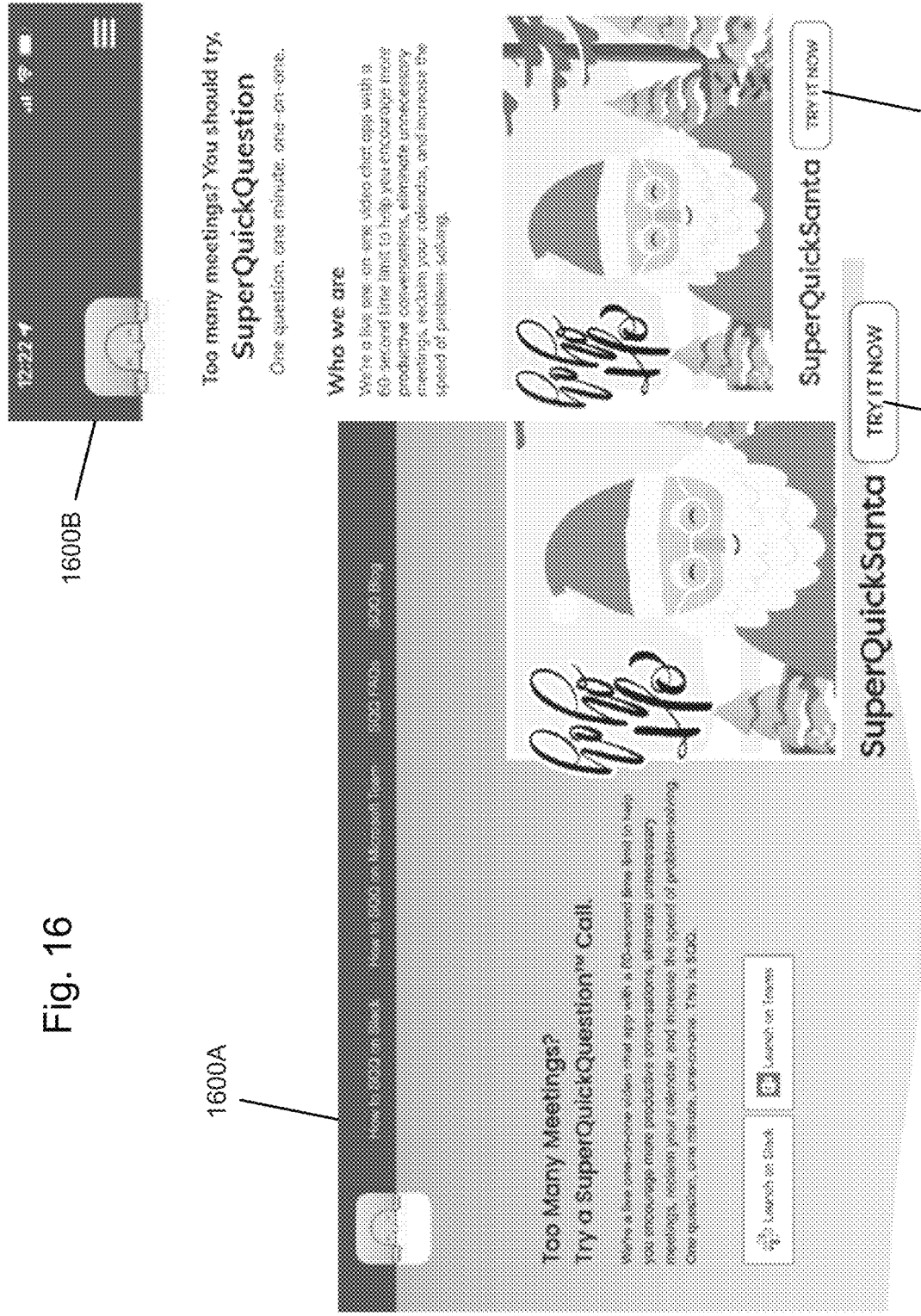
FIGS. 16 through 26 illustrate alternative guest web browser and mobile application interfaces, as shown side-by-side, and host web browser interfaces that may be used to establish timed one-on-one video conference calls according to embodiments.

FIG. 14 presents an exemplary countdown popup alert comprising a visual and audio indicator that the user's timed one-on-one video conference call session is about to start. At the end of the countdown, the timed one-on-one video conference call session may commence as disclosed above. When the timed one-on-one video conference call session is over, the user may be directed to a screen, as illustrated in FIG. 15 with next steps that the user may take.

FIGS. 16 through 26 present alternative guest web browser and mobile application interfaces, as shown side-by-side, and host web browser interfaces that may be used to establish timed one-on-one video conference calls according to embodiments. Website 1600A and mobile application 1600B may comprise a homepage or a unique page for a promotion that allows guests to participate in a timed one-on-one video conference call with "Santa." Website 1600A and mobile application 1600B include button 1602A and 1602B, respectively, which may be configured to launch a registration page to join a queue on the timed one-on-one video conference call.

Figure 17:
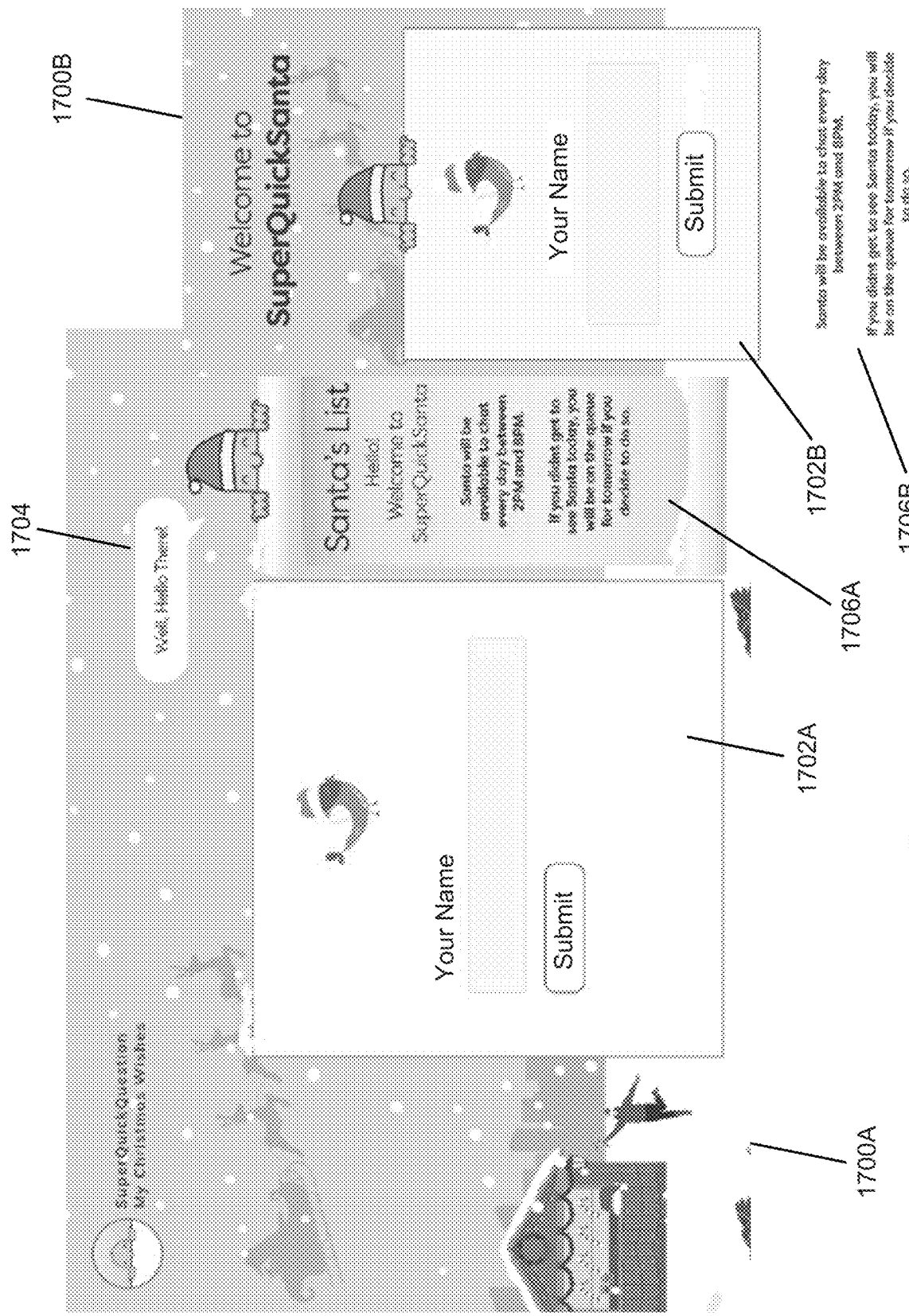

FIG. 17 presents exemplary interfaces to register for entering a queue of a timed one-on-one video conference call according to an embodiment. Before joining a timed one-on-one video conference call, a guest may register to join the host's queue (e.g., "Santa"). A guest may be asked to enter their name or email address in dialog windows 1702A and 1702B of webpage 1700A and mobile application screen 1700B, respectively. Information entered in dialog windows 1702A and 1702B may be passed over to a host of the timed one-on-one video conference call to be added to the host's queue.

Webpage 1700A further includes a message balloon 1704 comprising text that may be used to greet, entertain, and/or guide a guest in the process of registering for the timed one-on-one video conference call. Additionally, certain graphical elements, such as themes, icons, images, and background of webpage 1700A and mobile application screen 1700B may be customized. For example, in the illustrated embodiment, graphical elements of webpage 1700A and mobile application screen 1700B comprise a Christmas theme. Message dialog 1706A and 1706B may comprise a text field including messages from the timed one-on-one video conference call server or system. The messages may include information and/or details regarding availability of registering for a timed one-on-one video conference call with the host. Message dialog 1706A and 1706B, may also be configured with customizable themes, images, icons, and text, e.g., "Santa's List."

Figure 18:
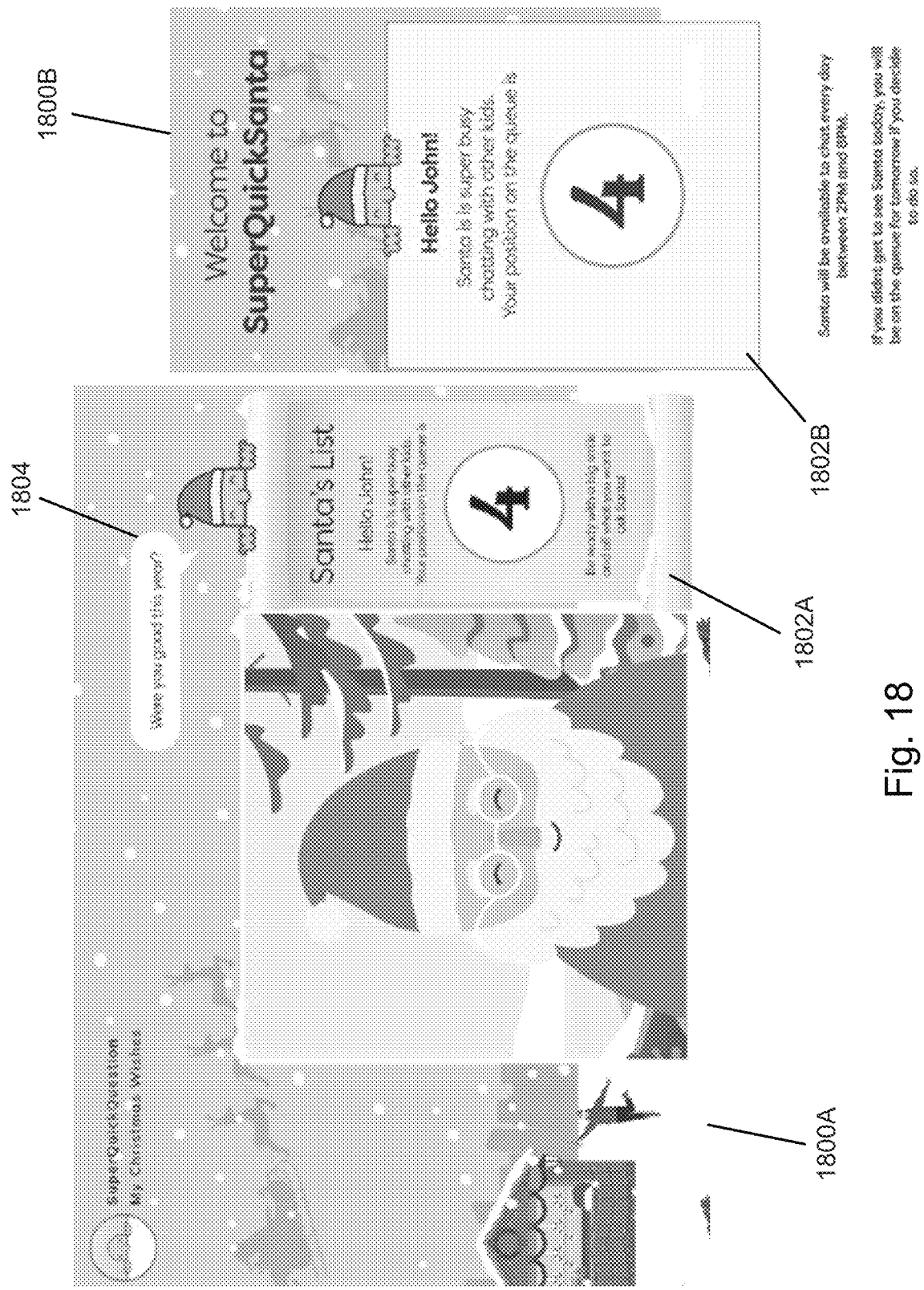

FIG. 18 presents exemplary guest queuing interfaces according to an embodiment. Webpage 1800A and mobile application screen 1800B include message dialog 1802A and 1802B, respectively. Message dialog 1802A and 1802B may be populated with an indicator that displays the position of the guest on the host's queue. The indicator may count down allowing the guest to see that their turn to join the host is getting closer. The Webpage 1800A further includes a message balloon 1804 comprising text that may be used to entertain and/or guide the guest while waiting in the queue for the timed one-on-one video conference call.

Figure 19:
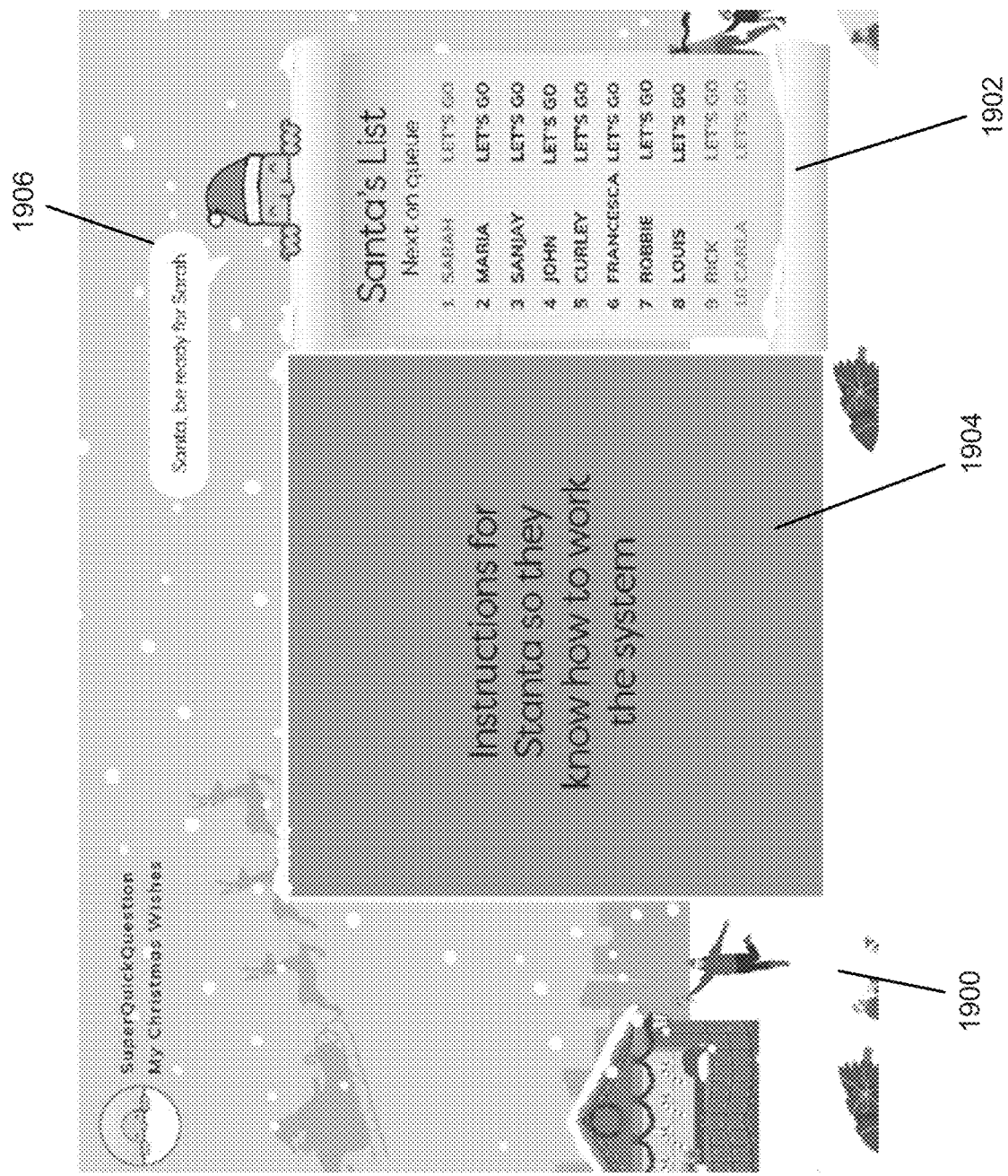

FIG. 19 presents an exemplary host queuing interface according to an embodiment. The host may manage a queue for the timed one-on-one video conference call via a webpage 1900. The webpage 1900 may be accessed by a unique link or address associated with an account or login/email address and password combination. Webpage 1900 includes a message dialog 1902 comprising a virtual queue. The virtual queue may allow the host to accommodate one or more guests for a timed one-on-one video conference call session. The virtual queue includes a list of queue requests from guests indicated by the guests' names and functionality to launch timed one-on-one video conference call invitations. The host may be allowed to skip over certain guests on the queue. The host may select a given name on the message dialog 1902 to initiate a timed one-on-one video conference call session and send an invitation to the initiated timed one-on-one video conference call session to the corresponding guest.

Upon sending the invitation, the host may be directed to a lobby to wait for the guest's response to join the timed one-on-one video conference call session. The guest may be given a predetermined amount of time to join the timed one-on-one video conference call session before timing out and removal from the queue. Instructions 1904 may comprise instructions for the host in using the host queuing interface. Webpage 1900 further includes a message balloon 1906 comprising text that may be used to further guide the host on the status of the virtual queue, e.g., the next person the queue.

Figure 20:
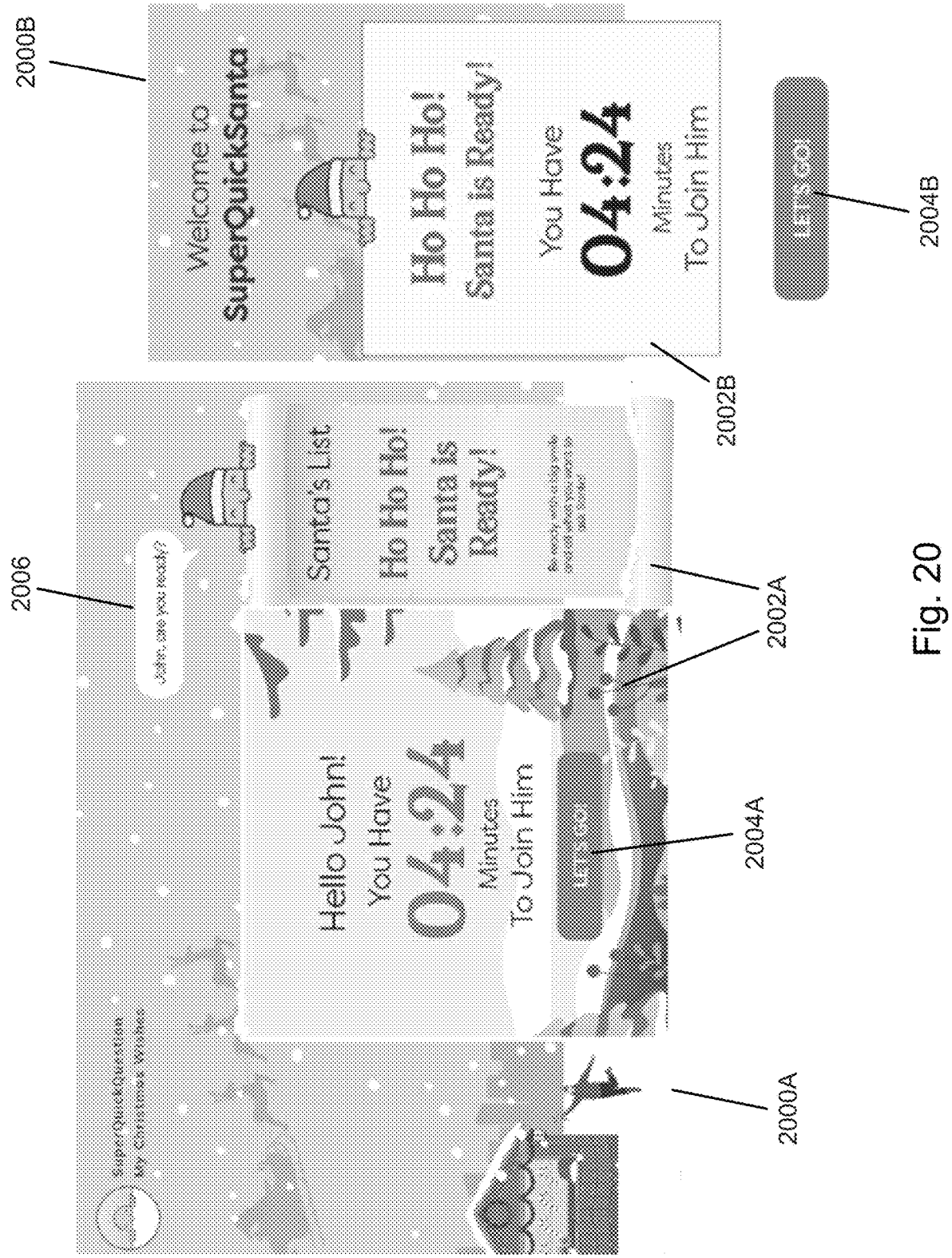

FIG. 20 presents exemplary queue ready interfaces for an invited guest according to an embodiment. A guest may be presented with a transition from webpage 1800A or mobile application screen 1800B to webpage 2000A or mobile application screen 2000B, respectively, to indicate that their position in the queue is ready and indicate that it's the guest's turn. The webpage 2000A and mobile application screen 2000B may notify the guest that an invitation to the timed one-on-one video conference call session is pending for the guest to join.

Webpage 2000A and mobile application screen 2000B include message dialog 2002A and 2002B for messaging functionality, such as a countdown indicating a time remaining to join the timed one-on-one video conference call session. Webpage 2000A further includes a message balloon 2006 to guide the guest on joining the timed one-on-one video conference call session. The guest may join the timed one-on-one video conference call session via buttons 2004A and 2004B.

Figure 21:
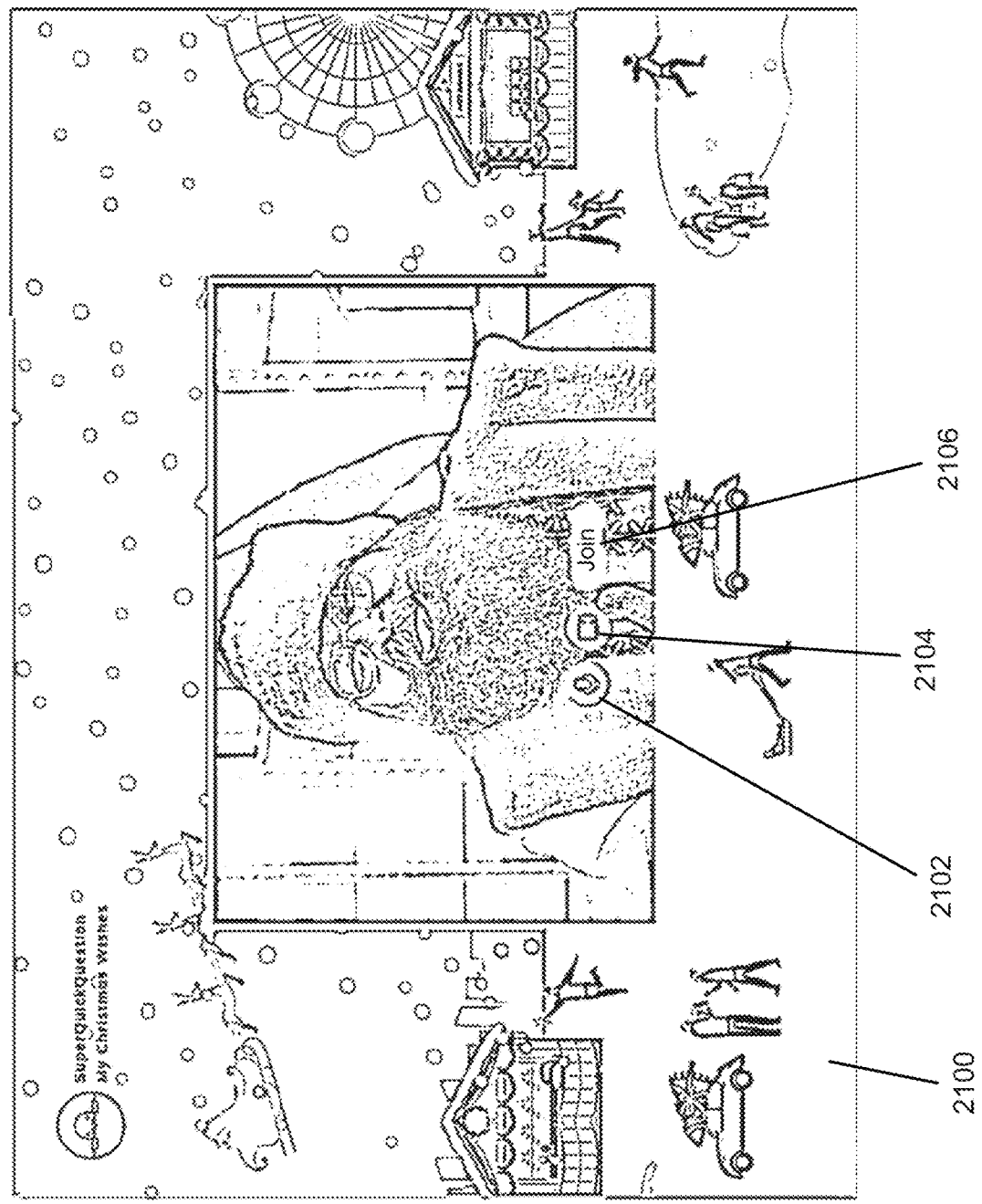

FIG. 21 presents an exemplary host lobby interface according to an embodiment. Webpage 2100 includes microphone 2102 and camera 2104 that provide for selection of a video source and an audio source on the host's device. In particular, microphone 2102 allows the host to select an audio source and camera 2104 allows the host to select a camera source. The audio source and the camera source provide for a video stream and an audio stream to be used within the timed one-on-one video conference call. Join button 2106 allows the host into the timed one-on-one video conference call with a guest.

Figure 22:
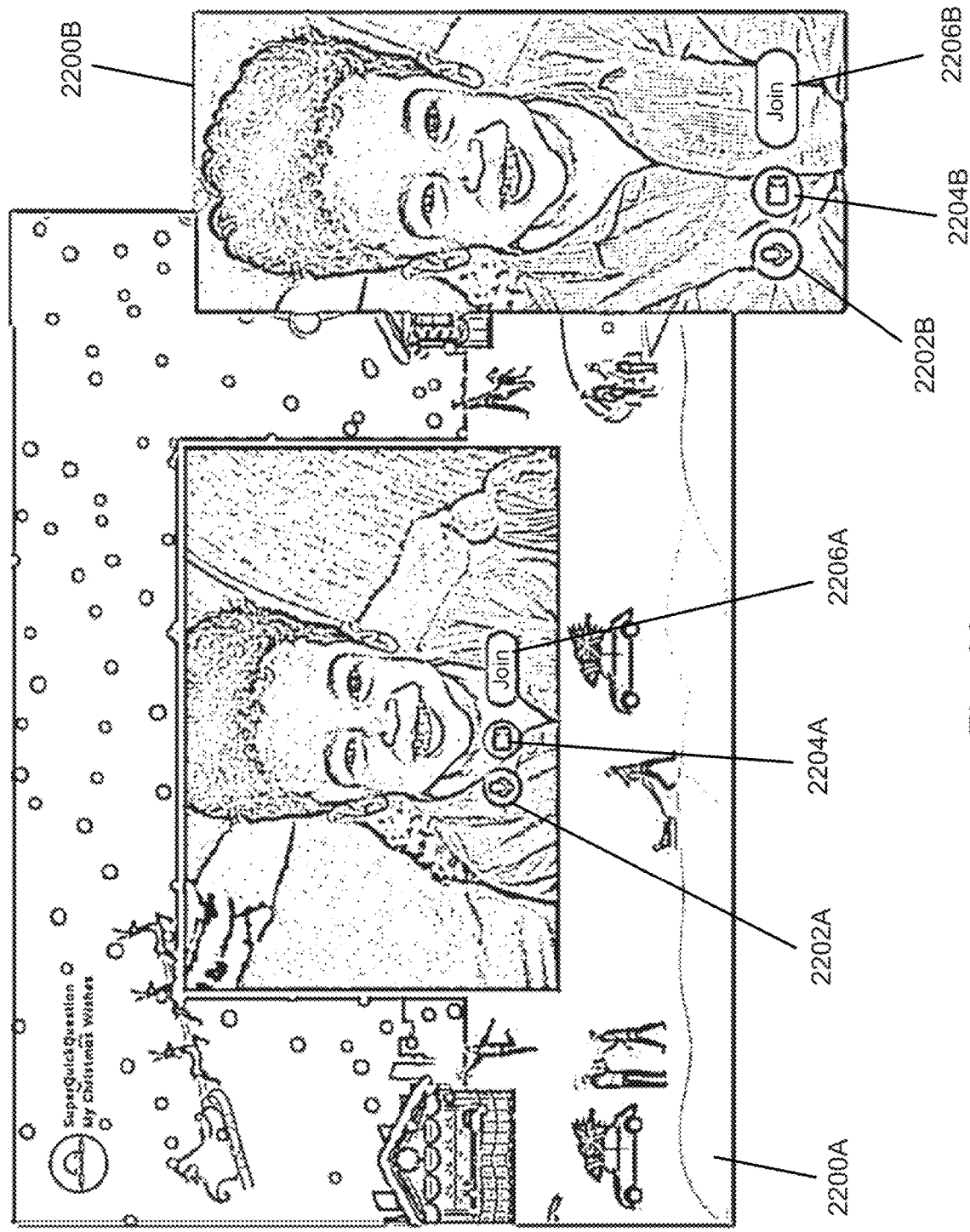

FIG. 22 presents an exemplary guest lobby interface according to an embodiment. Webpage 2200A and mobile application screen 2200B includes microphone 2202A and 2202B, respectively, that allows a guest to select an audio source on the guest's device and camera 2204A and 2204B, respectively, that allows the guest to select a video source on the guest's device that will provide for a video stream and an audio stream to be used within the timed one-on-one video conference call. Join buttons 2206A and 2206B allow the guest to participate in the timed one-on-one video conference call with the host. Once join signals are received from both the host and the guest, a shared conference call interface may be rendered on both the host's device and the guest's device to begin the timed one-on-one video conference call.

Figure 23:
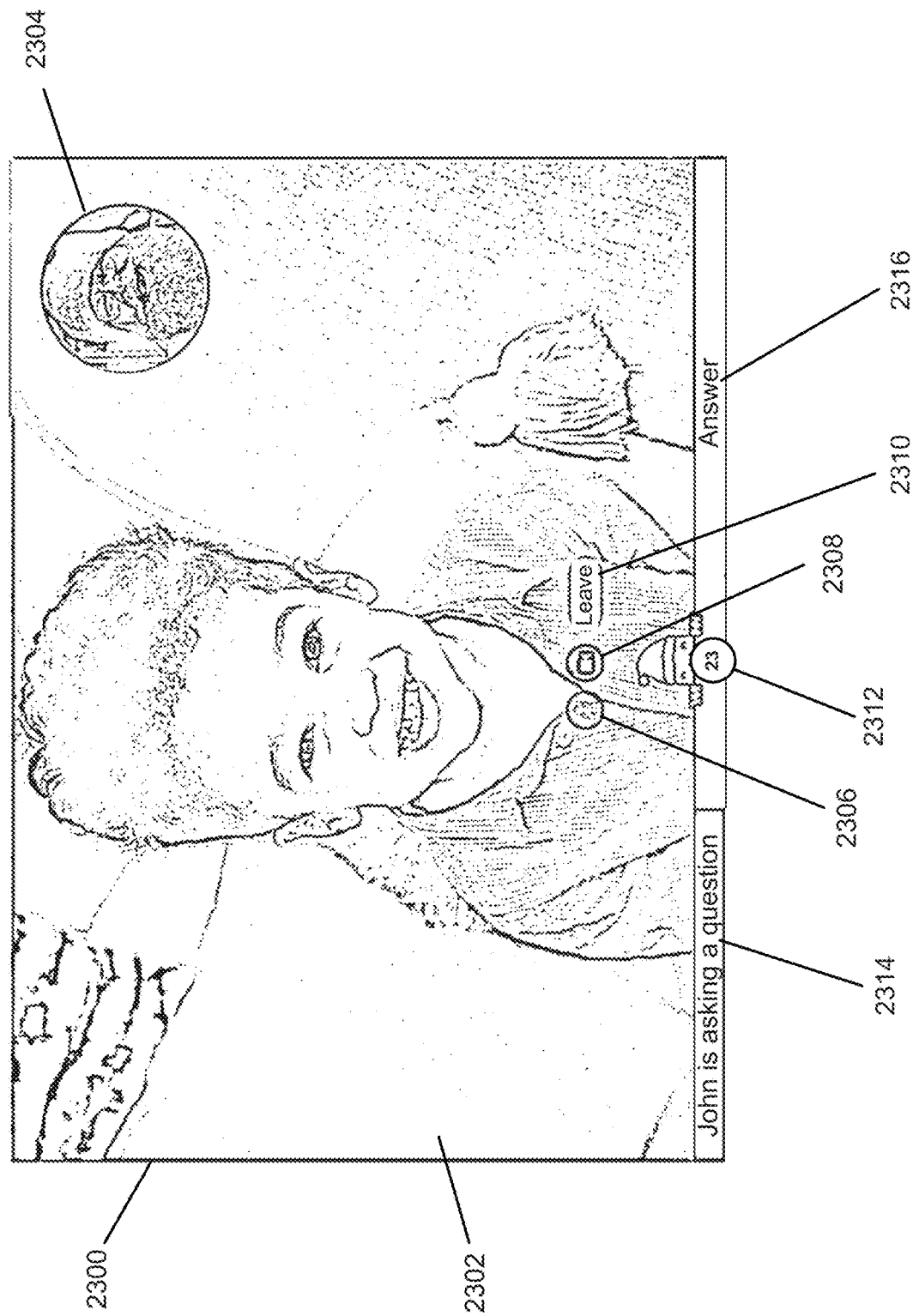

FIG. 23 presents an exemplary host conference call interface according to an embodiment. The host conference call interface comprises a webpage 2300 including a guest video window 2302 that displays a video stream along with an audio stream originating from the user device of the guest. Host video window 2304 displays a video stream along with an audio stream originating from the user device of the host. Microphone 2306 may allow the host to enable/disable an audio source (e.g., mute). Camera 2308 may allow the host to enable or disable their video feed. Leave button 2310 may provide for interaction by the host for signaling their respective termination of the timed one-on-one video conference call.

A timer ribbon 2312 provides a visual display of the timer count up to a total length of time. The timer ribbon 2312 may be divided into a question portion 2314 and an answer portion 2316. While the timer ribbon 2312 is in the question portion 2314, the guest video window 2302 may be sized to encompass the majority of the host conference call interface while the host video window 2304 may be sized to encompass a minority of the host conference call interface.

Figure 24:
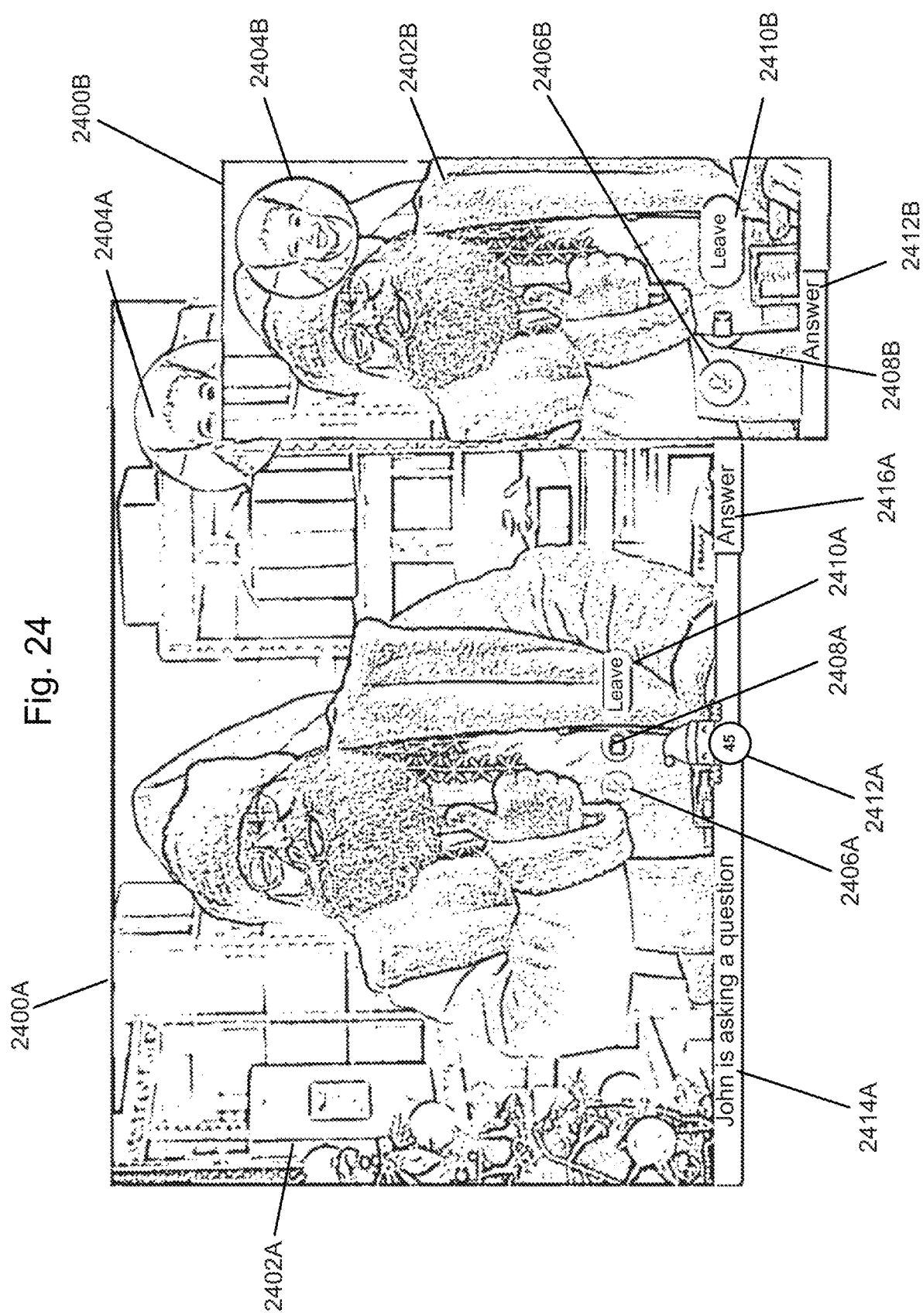

FIG. 24 presents an exemplary guest conference call interface according to an embodiment. The guest conference call interface comprises a webpage 2400A and mobile application screen 2400B including a host video window 2402A and 2402B that displays a video stream along with an audio stream originating from the user device of the host. Guest video window 2404A and 2404B displays a video stream along with an audio stream originating from the user device of the guest. Microphone 2406A and 2406B may allow the guest to enable/disable an audio source (e.g., mute). Camera 2408A and 2408B may allow the guest to enable or disable their video feed. Leave button 2410A and 2410B may provide for interaction by the guest for signaling their respective termination of the timed one-on-one video conference call.

Timer ribbon 2412A and 2412B provide visual displays of a timer count up to a total length of time. The timer ribbon 2412A may be divided into a question portion 2414A and an answer portion 2416A. Timer ribbon 2412B may indicate whether it is in a question portion or the answer portion. While the timer ribbon 2412A is in the answer portion 2416A or the timer ribbon 2412 indicates an answer portion, the host video window 2402A may be sized to encompass the majority of the conference call interface while the guest video window 2404A may be sized to encompass a minority of the guest conference call interface.

The timer ribbon and other elements of the host and guest conference call interfaces may include customized branding, icons, and images corresponding to a theme (e.g., Christmas).

Figure 25:
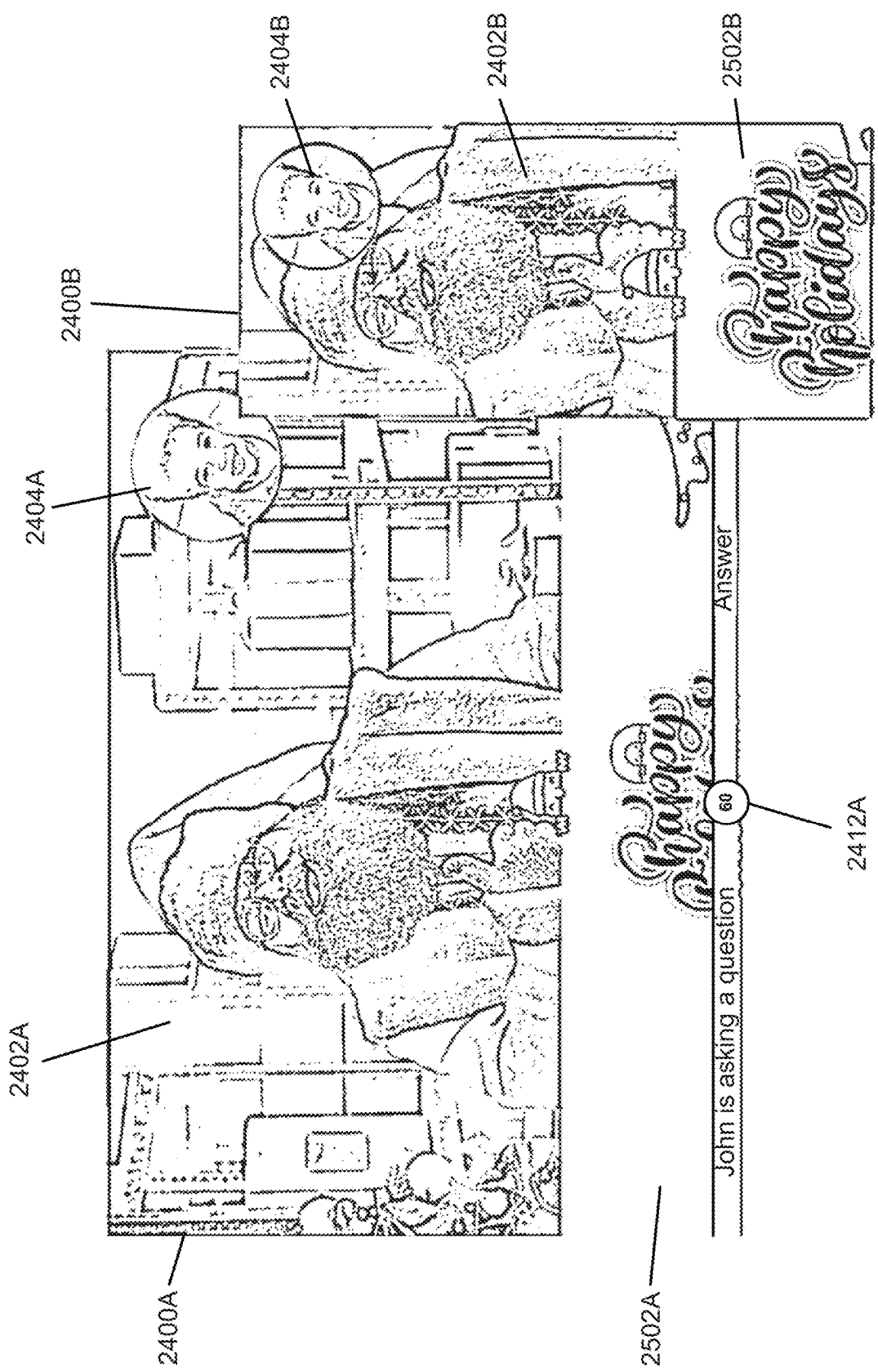

FIG. 25 presents an exemplary digital curtain within the guest conference call interface according to an embodiment. Upon expiration of timer ribbon 2412A, digital curtain 2502A and 2502B begins a transition from a bottom portion of the guest conference call interface to a higher portion of the guest conference call interface. The transition may begin at the end of the answer portion of the timer ribbon 2412A. Along with the digital curtain 2502A and 2502B during the transition, a customizable themed music may be played to indicate an end to the timed one-on-one video conference call between the guest and the host.

Figure 26:
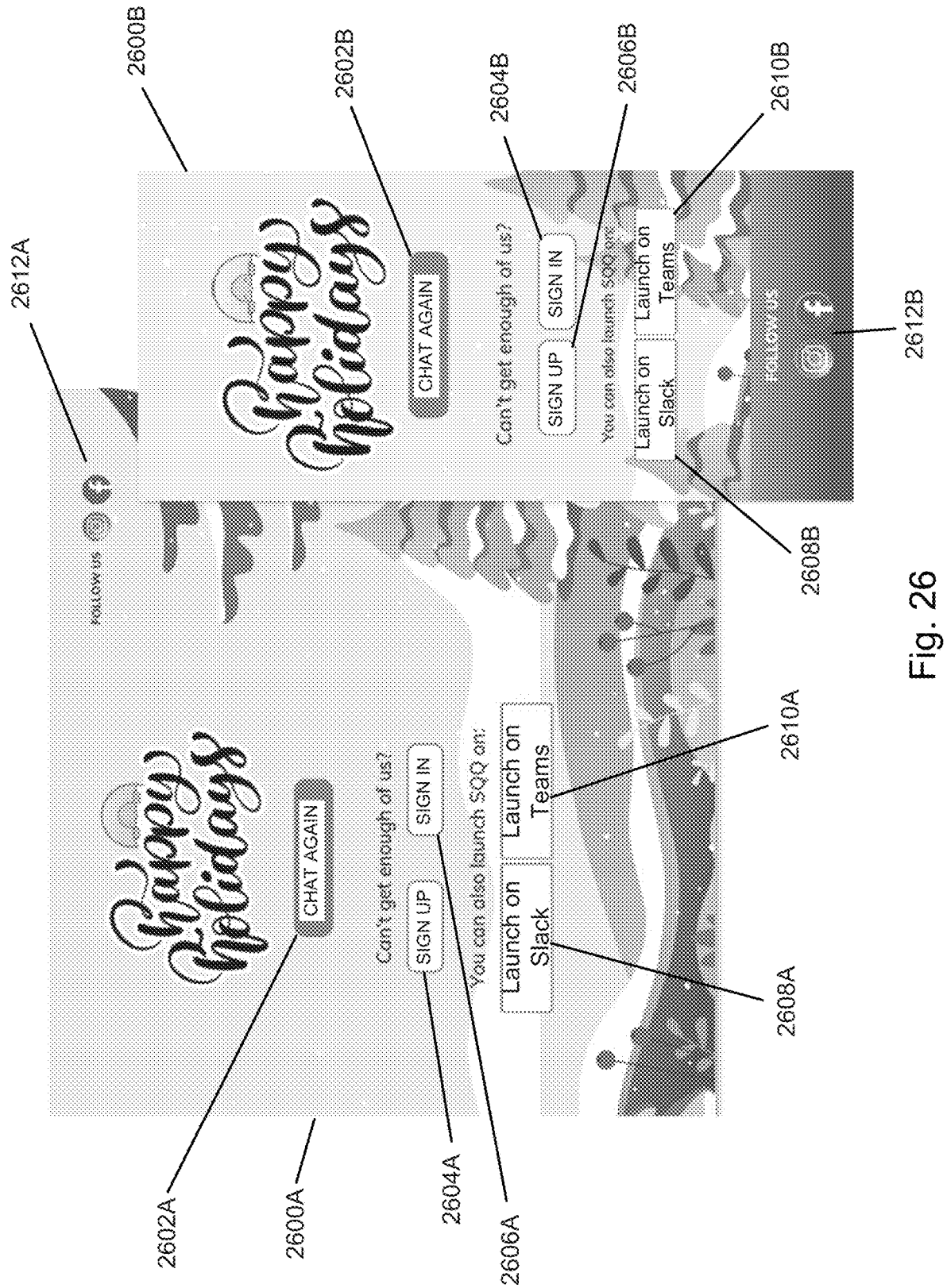

FIG. 26 presents closing messaging screens according to an embodiment. Upon completion of the timed one-on-one video conference call, the guest may be presented with webpage 2600A and mobile application screen 2600B. The webpage 2600A and mobile application screen 2600B include chat again button 2602A and 2602B for allowing a guest to start a new timed one-on-one video conference call. Sign up button 2604A, 2604B and sign in button 2606A and 2606B may allow the guest to register to login to with an account to participate in other timed one-on-one video conference calls. Timed one-on-one video conference calls may be integrated with business communication platforms, such as Slack and Microsoft Teams, which may be downloaded via buttons 2608A, 2608B, 2610A, and 2610B. Social media links 2612A and 2612B direct the guest to social media platforms for a particular sponsor or company affiliated with the ended timed one-on-one video conference call.

Upon completion of the timed one-on-one video conference call the host may return to the webpage 1900 where the virtual queue in the message dialog 1902 is updated for the next guest and the sequence may be repeated until all guests are cleared in the queue.

Figure 27:
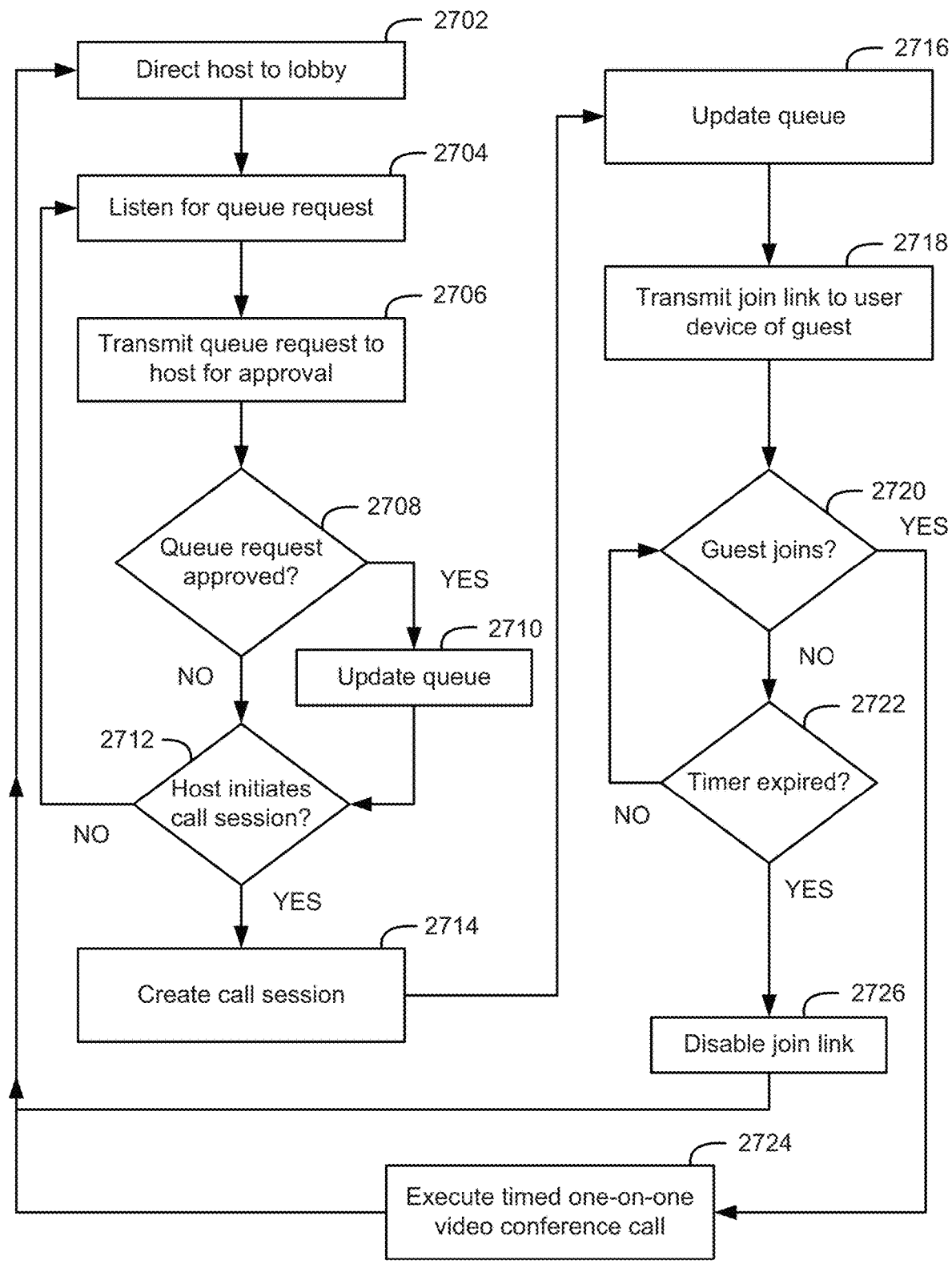
FIG. 27 illustrates a flowchart of a method for facilitating timed one-on-one video conference call sessions according to an embodiment.

FIG. 27 illustrates a flowchart of a method for facilitating timed one-on-one video conference call sessions according to an embodiment. A host may communicate with a communication server to create timed one-on-one video conference call sessions via queuing. A user device of the host is directed to a lobby interface by the communication server, step 2702. Directing the user device of the host to the lobby interface may include the communication server creating a queue for the host.

The communication server listens for a queue request, step 2704. A webpage or application interface may be created by the communication server to allow guests to schedule timed one-on-one video conference call sessions with the host via queue requests. Queue requests may comprise messages including a guest name or identifier, email address, and optionally a date and time block. A queue request from a user device of a guest may be received by the communication server. The communication server transmits the queue request to the host for approval, step 2706. The host may be presented with the queue request in the lobby interface for review. The communication server determines whether the queue request is approved by the host, step 2708. If the queue request is approved, the queue is updated with the queue request, step 2710. Updating the queue request may comprise adding the guest associated with the queue request to the queue in a first-in-first-out fashion. However, it is noted that other queuing methods may be employed.

The communication server proceeds to determine whether the host initiates a timed one-on-one video conference call session from the queue, step 2712 after updating the queue or if the queue request is not approved in 2708. The host initiating a timed one-on-one video conference call session from the queue may include receiving a selection of a guest from the queue.

If the host does not initiate a timed one-on-one video conference call session, the communication server continues to list for a queue request, step 2704. Otherwise, if the host initiates a timed one-on-one video conference call session, a timed one-on-one video conference call session is created between the selected guest and the host, step 2714. The queue is updated by removing the selected guest from the queue, step 2716.

A join link is transmitted to the user device of the selected guest, step 2718. The guest may be given a predetermined amount of time to join the timed one-on-one video conference call session. A timer to join the timed one-on-one video conference call session may be started. The communication server listens for a join response to the link from the guest, step 2720. If not, the communication server determines whether the timer has expired, step 2722. The communication server continues to listen for the join response until expiration of the timer, then of which, the join link is disabled, step 2726, and the host is directed back to the lobby.

If the communication server receives a join response to the link from the guest before expiration of the timer, instructions for carrying out the timed one-on-one video conference call session are executed, step 2724. The instructions may include retrieving video and audio streams from the user device of the host and the user device of the guest and presenting the retrieved video and audio streams to the host and guest. The timed one-on-one video conference call session may terminate upon host or guest command or upon an expiration of a timer ribbon, as disclosed herewith. Upon termination of the timed one-on-one video conference call session, the host is directed back to the lobby at step 2702.

Figure 28:
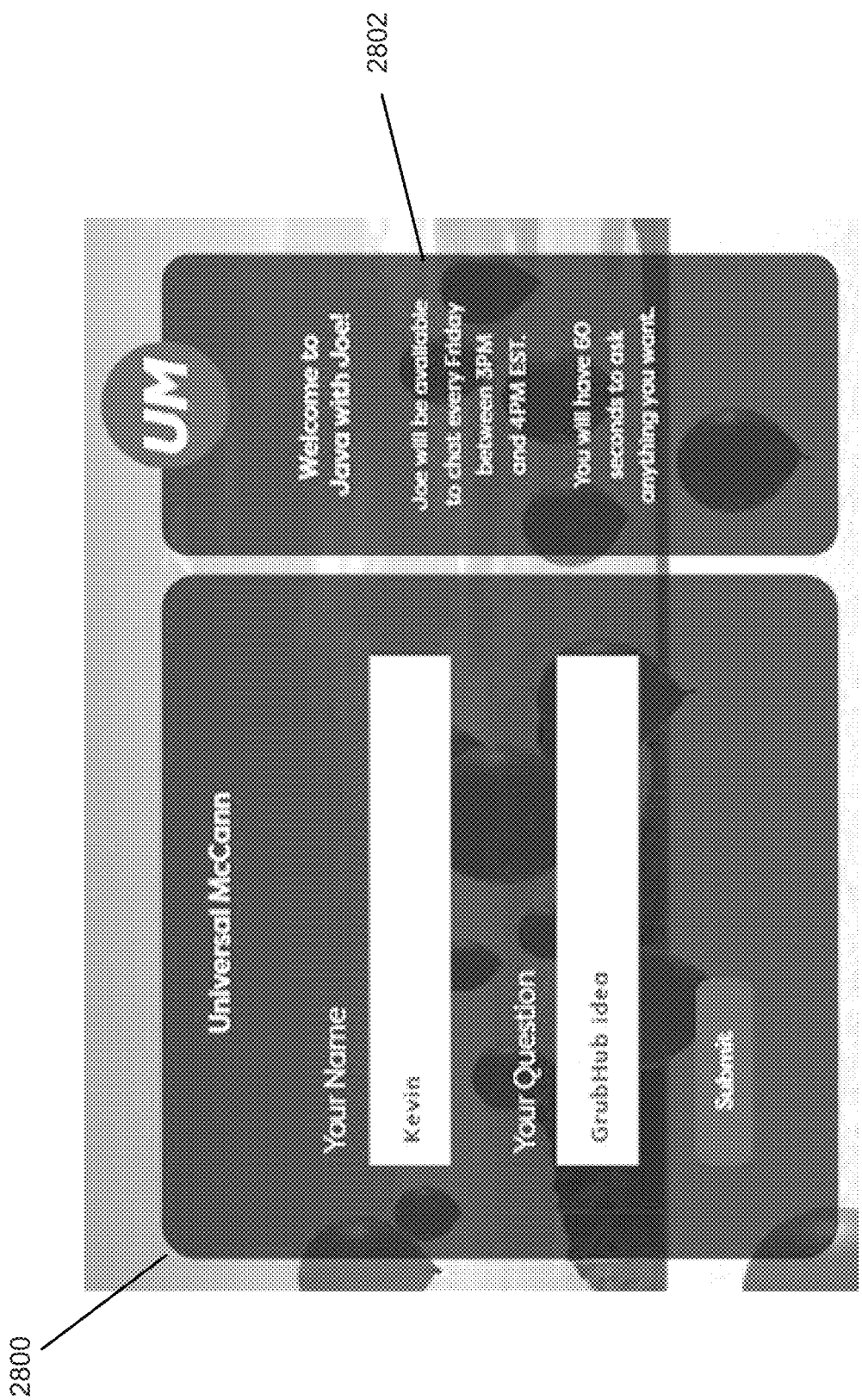
FIGS. 28-30 illustrate interfaces for allowing a guest to join a timed one-on-one video conference call according to some embodiments.
Figure 29:
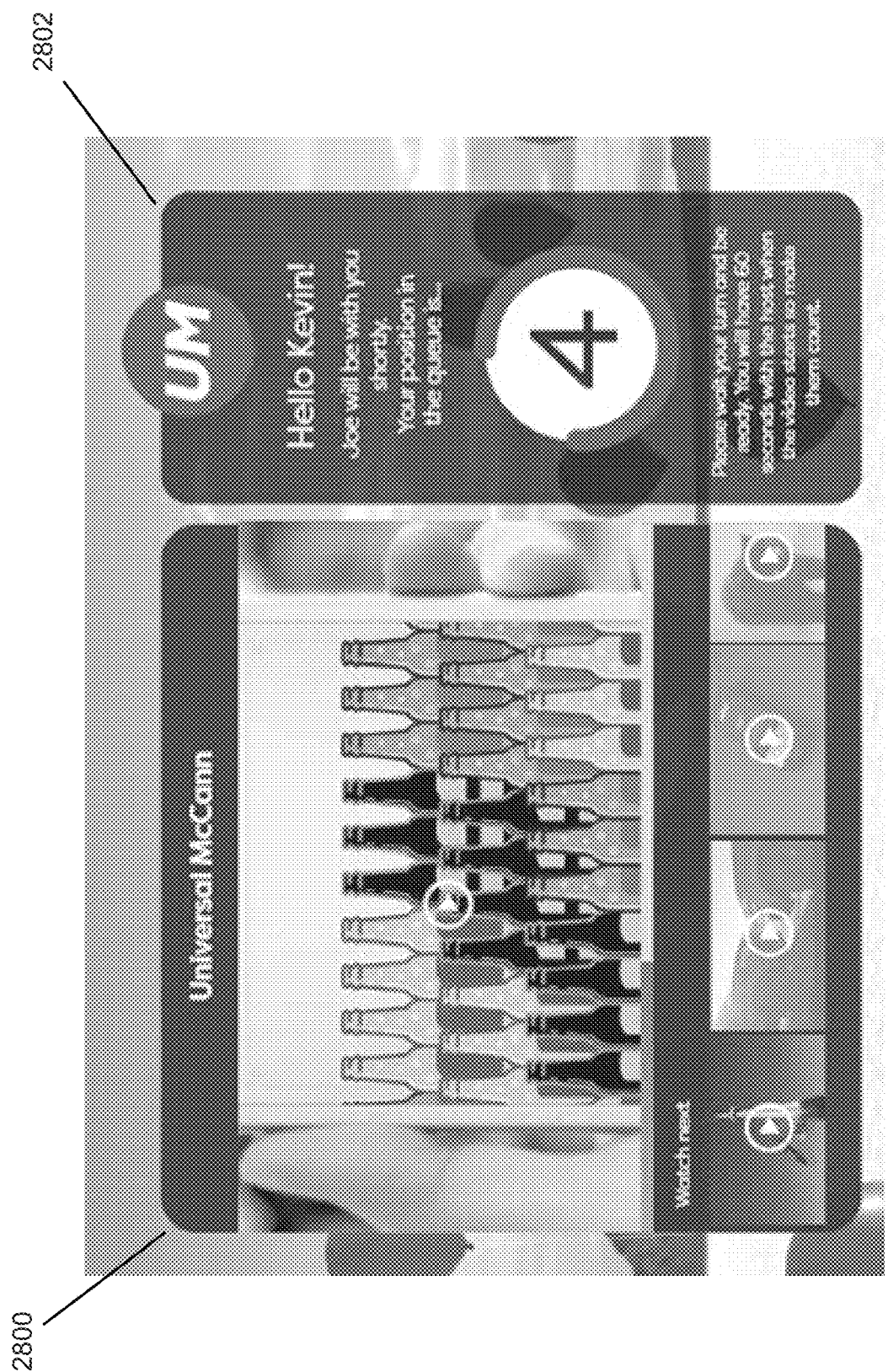
Figure 30:
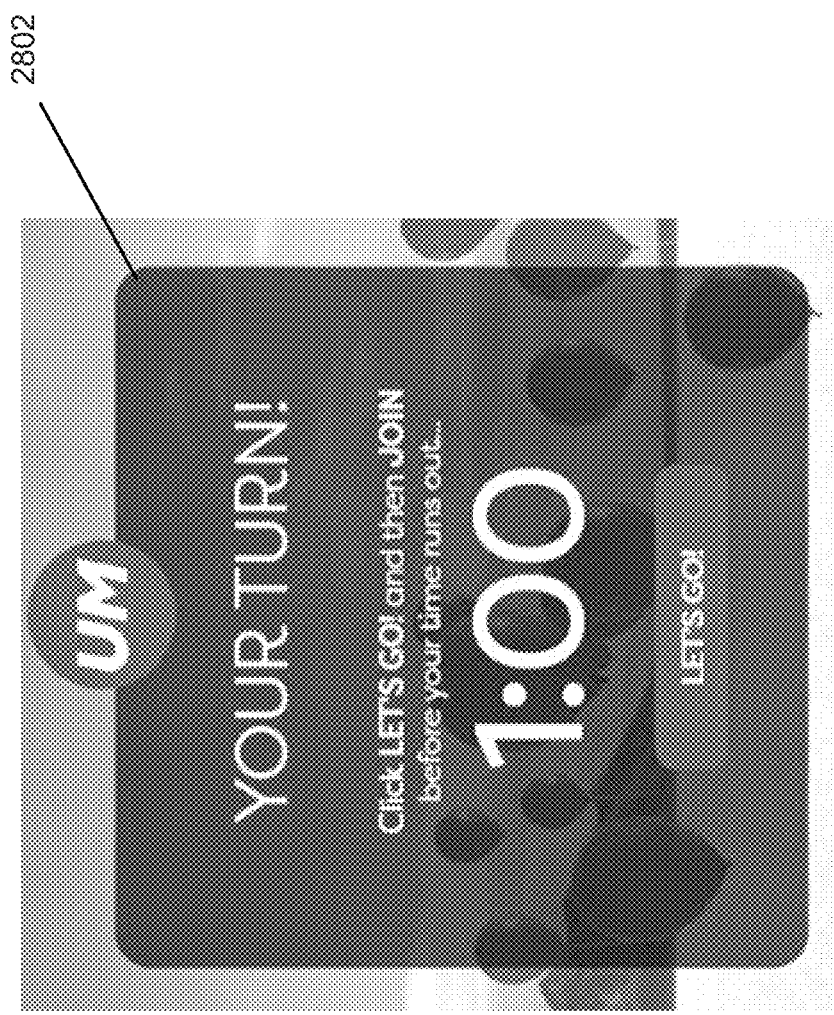

FIGS. 28 through 30 present exemplary interfaces for allowing a guest to join a timed one-on-one video conference call according to another embodiment. The interface presented in FIG. 28 may be generated by a communication server and presented to a guest on a client device for participating in a timed one-on-one video conference call created by a host. The guest may access the interface via a link or entering unique identifier specifying a particular timed one-on-one video conference call. The interface may include a request window 2800 and an information window 2802. The request window 2800 may include fields for a guest to enter their name along with a question or topic. Information window 2802 may include information, such as a welcome message, time/day availability, and parameters of the timed one-on-one video conference call.

Information entered into the fields of request window 2800 may be submitted to the communication server hosting the timed one-on-one video conference call. The guest may be entered into a queue for the timed one-on-one video conference call with the host. The queue for the timed one-on-one video conference call may include a plurality of positions or time slots that can be reserved by guests on a first-come-first-serve basis. Each position or time slot in the queue may correspond to a given portion of a timed one-on-one video conference call session that a guest is allowed to participate in with the host. Accordingly, the queue may control and determine which guest may join the timed one-on-one video conference call session with the host.

After submitting the information via the request window 2800, the request window 2800 is instructed by the communication server to transition to video advertisements, as shown by FIG. 29. The communication server also updates the information window 2802 to confirm submission of information previously entered in the request window 2800 and informs the guest of their position in queue status. The video advertisements may remain in the request window 2800 while the guest waits for their turn in the queue. Video advertisements in request window 2800 may automatically play in a playlist or manually selected.

When the guest has reached the top of the queue, they may be notified in information 2802 (shown in FIG. 30) and provided with a button to join the timed one-on-one video conference call with the host. The guest may be given a predetermined amount of time (e.g., one minute) to join the timed one-on-one video conference call before timing out and taken off the queue.

Figure 31:
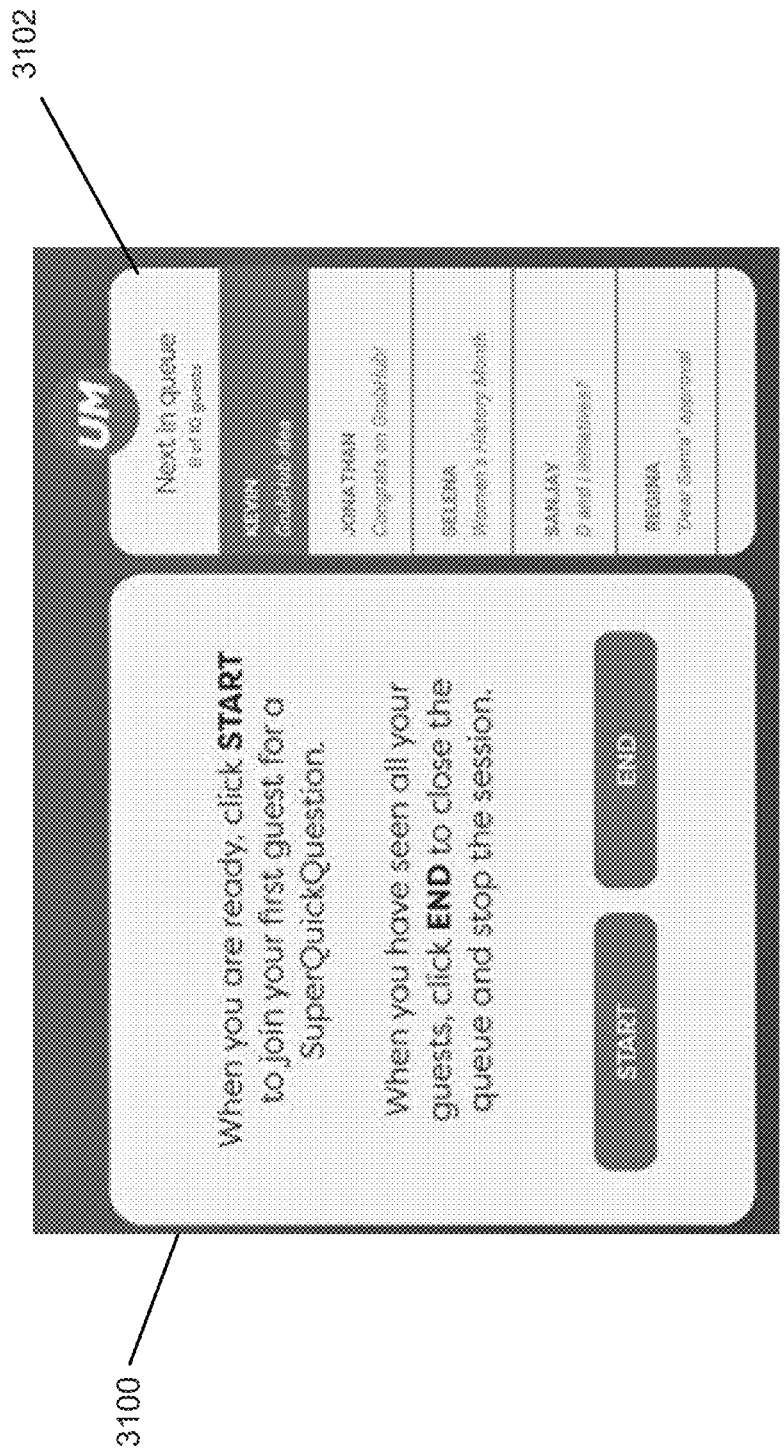
FIGS. 31-32 illustrate interfaces for allowing a host to join a guest in a timed one-on-one video conference call according to some embodiments.
Figure 32:
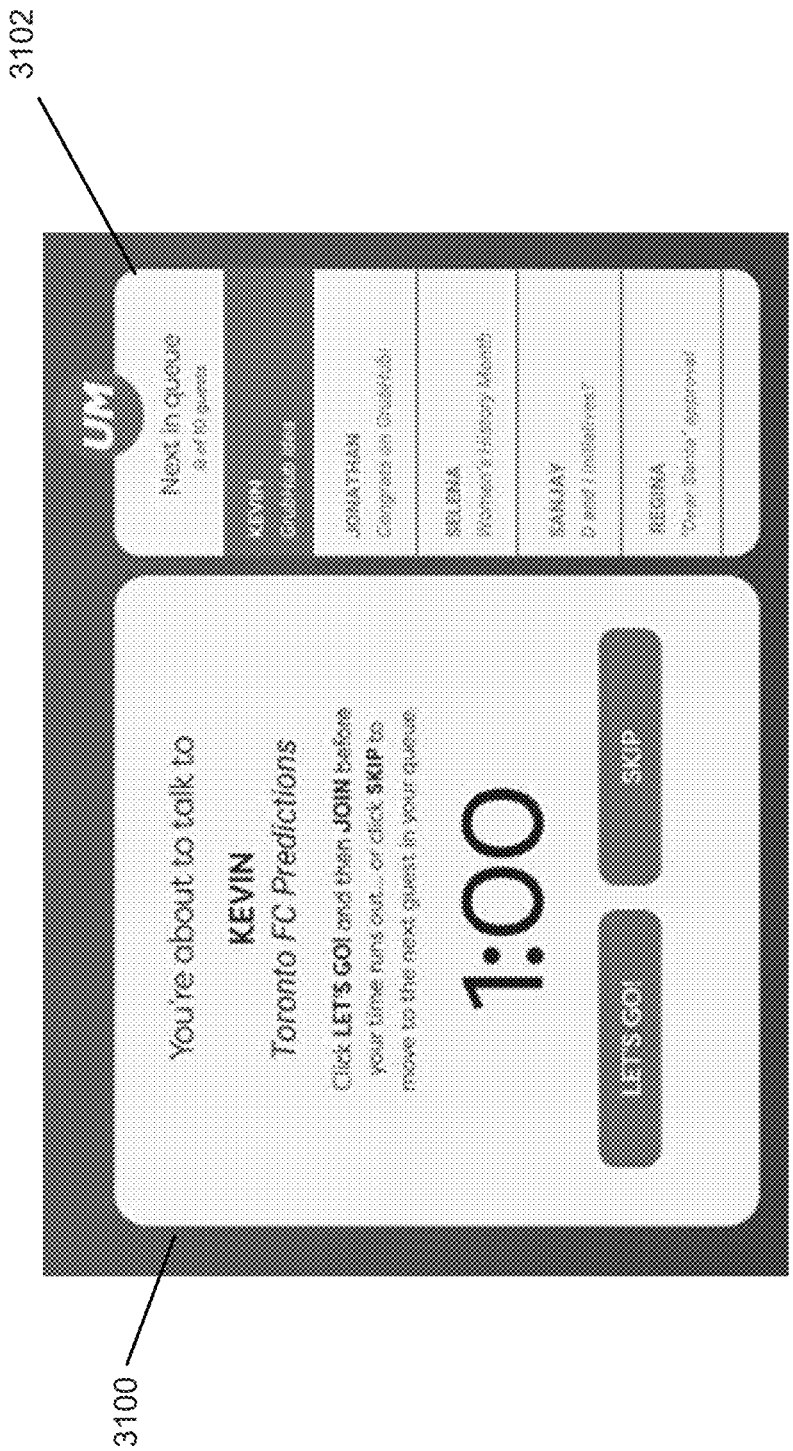
Figure 33:
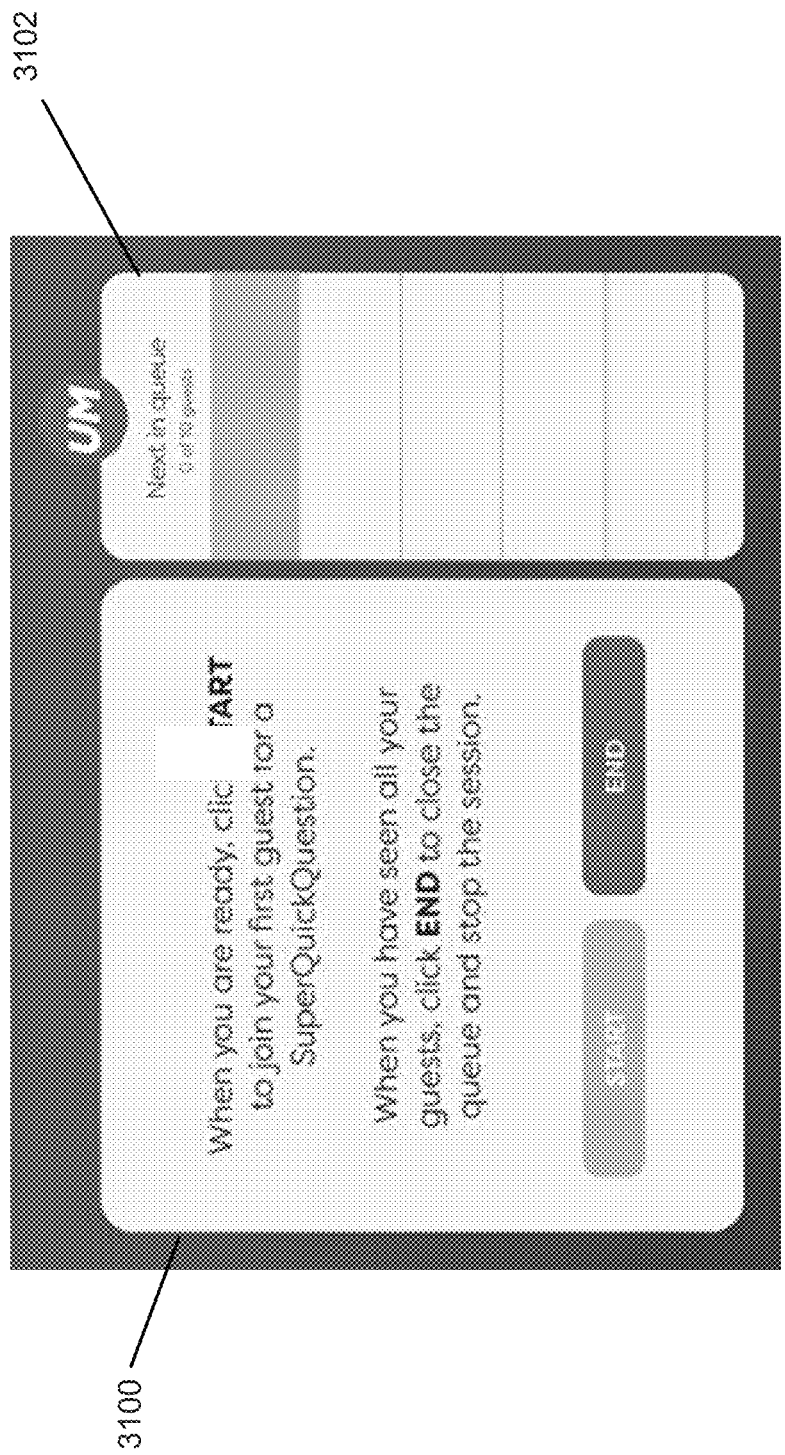
FIG. 33 illustrates an exemplary session window which allows a host to end a timed one-on-one video conference call session according to an embodiment.

FIGS. 31 through 33 present exemplary interfaces for allowing a host to manage guests for a timed one-on-one video conference call according to another embodiment. The interface presented in FIG. 31 may be generated by a communication server and presented to a host on a client device for allowing guests to participate in a timed one-on-one video conference call session with the host. The interface may include a session window 3100 and a queue 3102. Queue 3102 may include a plurality of slots each of which may indicate a guest's name along with a question or topic (e.g., entered via request window 2800 in FIG. 28). The session window 3100 may include a button for joining a guest at the top of queue 3102 in a timed one-on-one video conference call.

A timer may be presented in the session window 3100 to indicate an amount of time the host has to join the guest at the top of queue 3102 in the timed one-on-one video conference call, as shown in FIG. 32. The host may also skip over guests in queue 3102. The session window 3100 may also allow the host to end the timed one-on-one video conference call session at any time or when there are no more guests on the queue 3102 (FIG. 33).

Figure 34:
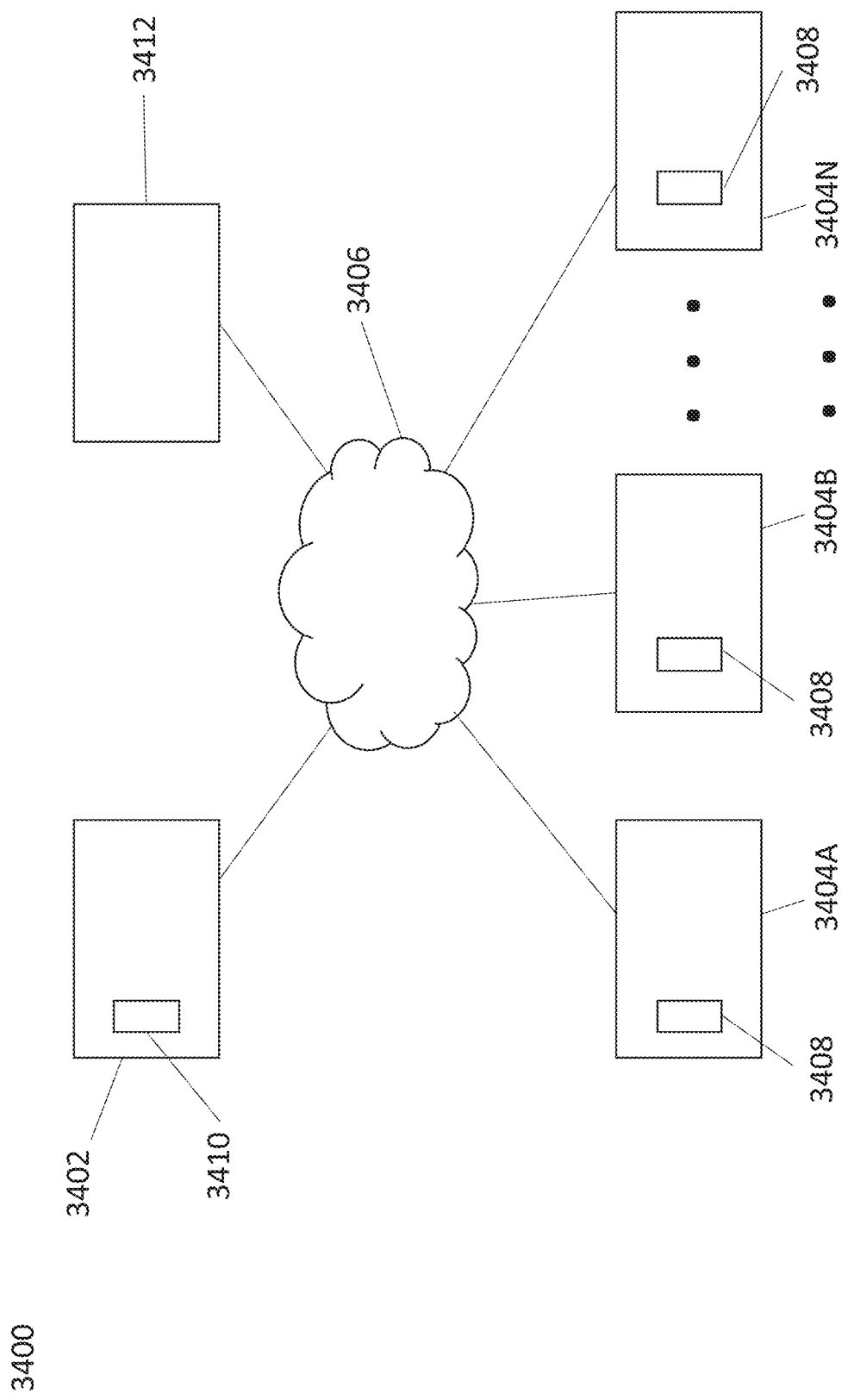
FIG. 34 illustrates an exemplary high-level system architecture for providing a timed one-on-one video conference call according to an embodiment.

FIG. 34 presents an exemplary high-level system architecture 3400 for providing a timed video call according to an embodiment disclosed herein. The system architecture 3400 comprises a communication server 3402 connected to user devices 3404A-N by a communication network 3406. The communication server 3402 is similar to and functions in the same manner as the communication server 102, the user devices 3404A-N are similar to and function in the same manner as the user devices 104A-N, and the communication network 3406 is similar to and functions in the same manner as the communication network 106. Each of the user devices 3404A-N is capable of implementing a client application 3408 for a timed video call that is limited to a predetermined duration, e.g., 60 seconds or another time duration. The client application 3408 is similar to and functions in the same manner as the client application 108. The communication server 3402 may be capable of implementing a server side application 3410 for a timed video call that includes sharing interfaces with embedded video and audio streams received from the user devices 3404A-N. The server side application 3410 is similar to and functions in the same manner as the server side application 110.

The system architecture 3400 further comprises a social media platform server 3412, such as the Discord® server, connected to the user devices 3404A-N and to the communication server 3402 by the communication network 3406. A first user device 3404A of a host may send a request over the communication network 3406 to the social media platform server 3412 to initiate a timed video call with a second user device 3404B of a guest. The social media platform server 3412 may send the request over the communication network 3406 to the communication server 3402. The communication server 3402 may transmit over the communication network 3406 to user devices 3404A and 3404B a unique meeting link to participate in the timed video call over the communication network 3406 as implemented by the communication server 3402. The social media platform server 3412 may include, by way of example, the server of social media platforms such as Discord®, Twitter®, Facebook®, Instagram®, Snapchat®, or of any other social media or communication platform where users are capable of sending or receiving links.

Figure 35:
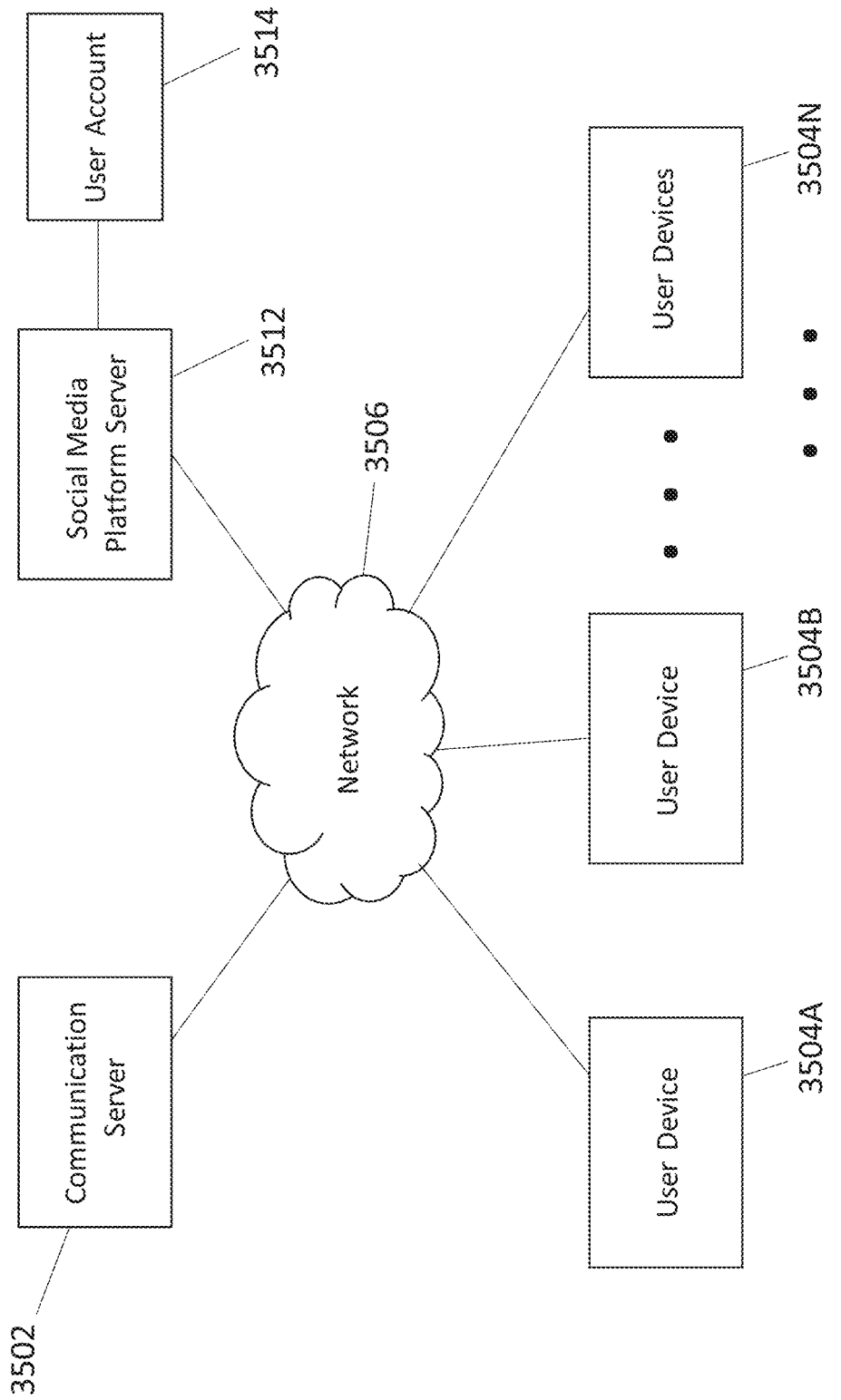
FIG. 35 illustrates an exemplary computing system for providing a timed one-on-one video conference call according to an embodiment.

FIG. 35 presents an exemplary computing system for providing a timed video call according to an embodiment. The user devices 3504A-N are similar to and function in the same manner as the user devices 704A-N. The user devices 3504A-N may access communication tools (e.g., chat, direct message, comment, contacts, etc.) provided by a social media platform server 3512, such as the Discord® server, via a communication network 3506. The communication network 3506 is similar to and functions in the same manner as the communication network 706, and the social media platform server 3512 is similar to and functions in the same manner as the social media platform server 3412. The communication tools may comprise cloud computing software-as-a-service ("SAAS") accessible by the user devices 3504A-N through client applications or web browser clients.

The communication tools may be integrated with a feature for creating and joining timed video calls. The integration may comprise a connection between a communication server 3502 and the social media platform server 3512 over the communication network 3506. The communication server 3502 is similar to and functions in the same manner as the communication server 702. Each of the user devices 3504A-N is capable of initiating and requesting a timed video call with another one of the user devices 3504A-N by sending links through the communication tools. The links may comprise software code or instructions for directing a host on a first user device 3504A and one or more guests on second ones of user devices 3504B-N to a communication connection with the communication server 3502.

The links may further instruct the communication server 3502 to receive and transmit electronic data from various sources, including but not limited to the user devices 3504A-N. For example, the communication server 3502 may be operable to receive and post or transmit video and audio streams originating from the user devices 3504A-N. The communication server 3502 may create a timed video call session between the first user device 3504A and second ones of user devices 3504B-N and populate a video call interface that is rendered on the first user device 3504A and second ones of user devices 3504B-N with the received video and audio streams. The video call interface may comprise an application, web application, or other software executing on the user devices 3504A-N. The communication server 3502 may further retrieve user information (e.g., name, username, profile photo, etc.) associated with the user devices 3504A-N from the social media platform server 3512 and populate the video call interface with the retrieved user information.

In certain embodiments, a timed video call may be generated with a question field which may be provided in a request to initiate the timed video call. The question field may be used to show the host and guest on a call interface the purpose or nature of the call.

Figure 36B:
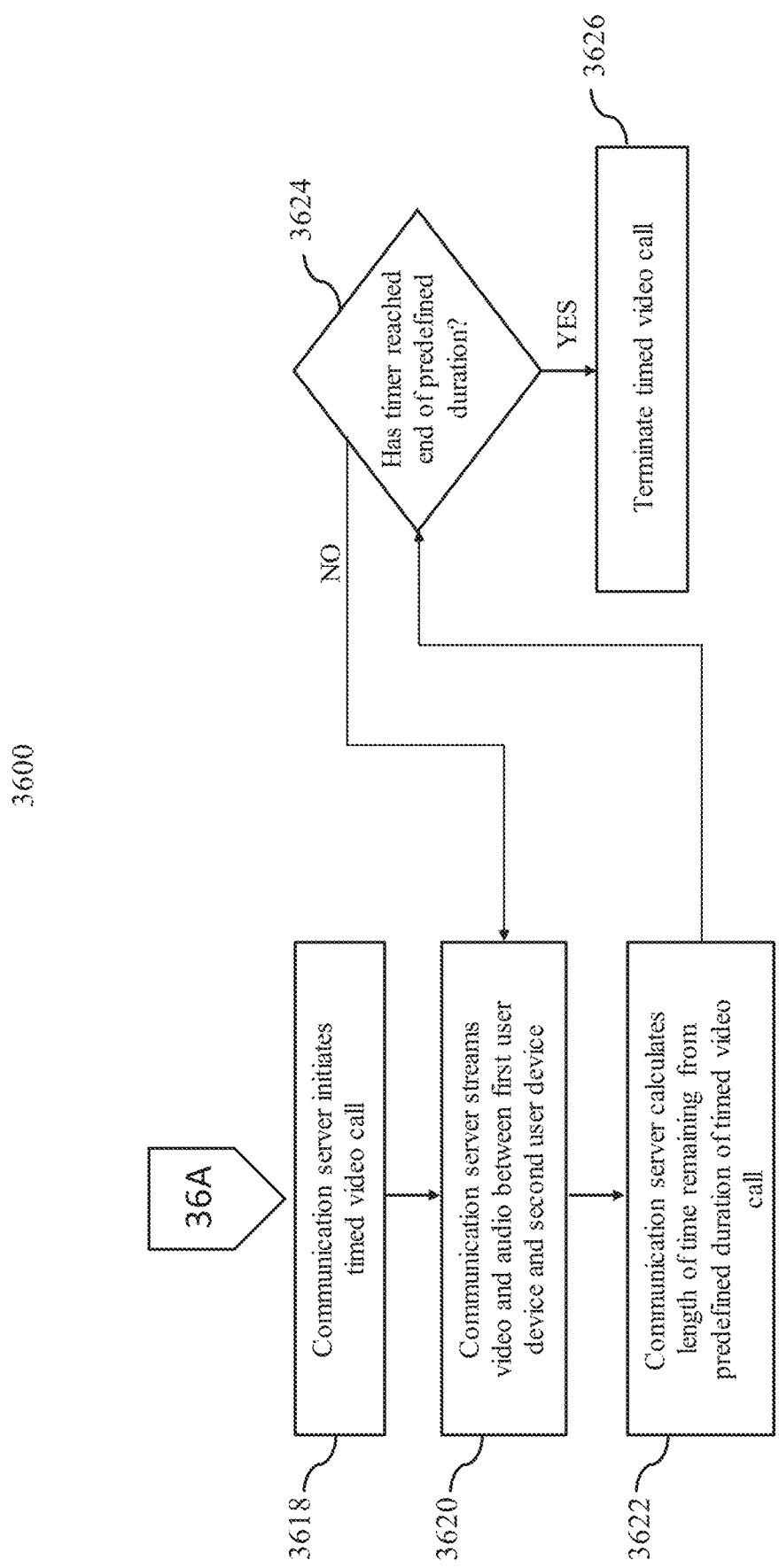
FIG. 36B illustrates a flowchart of a computer-implemented application that provides for a timed one-on-one video conference call according to another embodiment.

FIGS. 36A and 36B present a flowchart of a computer-implemented method for facilitating a timed video call according to an embodiment disclosed herein.

The method 3600 begins at step 3602 with a user account 3514 associated with the social media platform server 3512, such as the Discord® server, receiving over the communication network 3506 a request from a host user on a first user device 3504A to initiate a timed video call with a guest user on a second user device 3504B. The user account 3514 may be configured to provide the request and information corresponding to the request to the social media platform server 3512. In some embodiments, the user account 3514 is an automated account, or a bot, that may be configured to parse text and communicate with the social media platform server 3512. Such communication may include transmitting information to the social media platform server 3512 without further input from a user on a user device 3504N.

The timed video call may have a predefined duration, e.g., 60 seconds or another time duration. The request may comprise a typed command following a predetermined syntax, which may include a question field identifying the purpose or nature of the call, as well as a target field identifying the guest user on the second user device 3504B. The target field may include identification information such as a name, email address, username, phone number, or any other identifying information reasonably known to one of ordinary skill in the art.

Based at least in part on the request to initiate a timed video call, at step 3604, the user account 3514 parses the typed command to confirm that it follows the predetermined syntax.

If the typed command does not follow the predetermined syntax, then the user account conveys an error message. If the typed command follows the predetermined syntax, at step 3606, the user account 3514 parses the typed command to identify the guest user and the second user device 3504B.

At step 3608, the user account 3514 transmits the request to an application programming interface ("API") of the communication server 3502 over the communication network 3506.

At step 3610, the communication server API generates and transmits a unique meeting link to participate in the timed video call to the user account 3514 over the communication network 3506.

At step 3612, the user account 3514 transmits the unique meeting link to participate in the timed video call to the first user device 3504A and the second user device 3504B over the communication network 3506. In an embodiment, the link may connect the first user device 3504A and the second user device 3504B to a corresponding timed video call referenced in the database of the communication server 3502 over the communication network 3506 when engaged by the host and the guest. The link may be provided by a direct message ("DM"), Short Message Service ("SMS"), or shared by other forms of electronic communications.

At step 3614, the communication server 3502 receives over the communication network 3506 a response to the unique meeting link from at least the guest user on the second user device 3504B. In an exemplary embodiment, the received response may be the result of the guest user engaging the link received on the second user device 3504B.

At step 3616, the communication server 3502 determines whether the host user on the first user device 3504A and the guest user on the second user device 3504B have confirmed the timed video call. If confirmation has not been received, the timed video call is terminated.

If confirmation has been received, at step 3618, the communication server 3502 initiates the timed video call.

At step 3620, the communication server 3502 streams video and audio between the first user device 3504A and the second user device 3504B, the streamed video and audio rendered on a call interface on the first user device 3504A and the second user device 3504B, the call interface including a timer corresponding to a length of time used in or remaining from the predefined duration of the timed video call.

At step 3622, the communication server 3502 calculates the length of time remaining from the predefined duration of the timed video call. The timer on the call interface may also include a question portion indicator corresponding to a first length of time, and an answer portion indicator corresponding to a second length of time. The call interface may also include a leave button, wherein interacting with the leave button by either the host on the first user device 3504A and/or the guest on the second user device 3504B terminates the timed video call. The call interface may also include functionality for selecting a camera source and an audio source providing a video stream and an audio stream used within the timed video call. The call interface may also include a host user video window that displays a video stream originating from the first user device 3504A and a guest user video window that displays a video stream originating from the second user device 3504B. The host user video window may be sized to encompass a majority of the call interface, while the guest user video window may be sized to encompass a minority of the call interface during a question portion corresponding to a first length of time on the timer. During an answer portion corresponding to a second length of time on the timer, the guest user video window may be sized to encompass a majority of the call interface, while the host user video window may be sized to encompass a minority of the call interface.

Prior to initiating the timed video call, authentication on the communication server 3502 of the host on the first user device 3504A, the guest on the second user device 3504B, or both may be required. This authentication may be implemented on the communication server 3502 by any means reasonably known to one of ordinary skill in the art.

In an exemplary embodiment, the communication server 3502 may transmit over the communication network 3506 a lobby interface to be rendered on both the first user device 3504A of the host user and the second user device 3504B of the guest user. The lobby interface may include functionality for selecting a camera source and an audio source providing a video stream and an audio stream used within the timed video call. The lobby interface may further include a join button. In an exemplary embodiment, the call interface may not be rendered on the first user device 3504A of the host or the second user device 3504B of the guest until both the host user and the guest user have interacted with the join button on the lobby interface. Once the host on the first user device 3504A interacts with the join button, the communication server 3502 may render a meeting waiting area interface on the first user device 3504A. The meeting waiting area interface may include a leave button, as well as functionality for selecting a camera source and an audio source providing a video stream and an audio stream used within the timed video call. The meeting waiting area interface may persist until the guest user on the second user device 3504B has also interacted with the join button, or until the expiration of a preconfigured duration of time at which point the meeting expires.

In an exemplary embodiment, the host on the first user device 3504A may communicate with the communication server 3502 to create timed video call sessions via queueing, as described in FIG. 27.

At step 3624, the communication server 3502 determines whether the timer has reached the end of the predefined duration of the timed video call. If the timer has not reached the end, the call continues and the communication server 3502 streams video and audio between the first user device 3504A and the second user device 3504B until time runs out.

If the timer has reached the end of the predefined duration, the method 3600 ends at step 3626 with terminating the timed video call.

Figure 37:
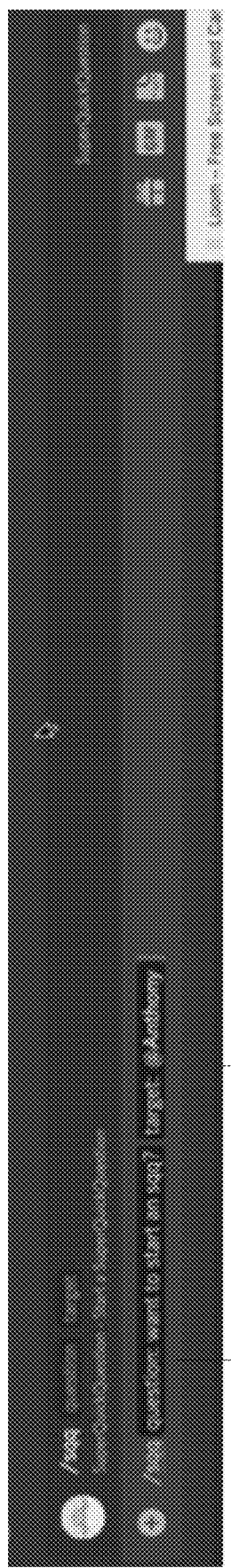
FIG. 37 illustrates an exemplary request to initiate a timed one-on-one video conference call according to an embodiment.

FIG. 37 presents an exemplary request to initiate a timed video call according to an embodiment. A host user on a first user device 3504A sends a request to the social media platform server 3512, such as the Discord® server, over the communication network 3506 to initiate a timed video call with a guest user on a second user device 3504B. The request comprises a typed command following a predetermined syntax, which includes a question field 3702 identifying the purpose or nature of the call, as well as a target field 3704 identifying the guest user on the second user device 3504B. The target field 3704 may include identification information such as a name, email address, username, phone number, or any other identifying information reasonably known to one of ordinary skill in the art. In one embodiment, the typed command is entered into a general chat area of the social media platform. In another embodiment, the typed command may be provided by a DM to the user account 3514.

Figure 38:
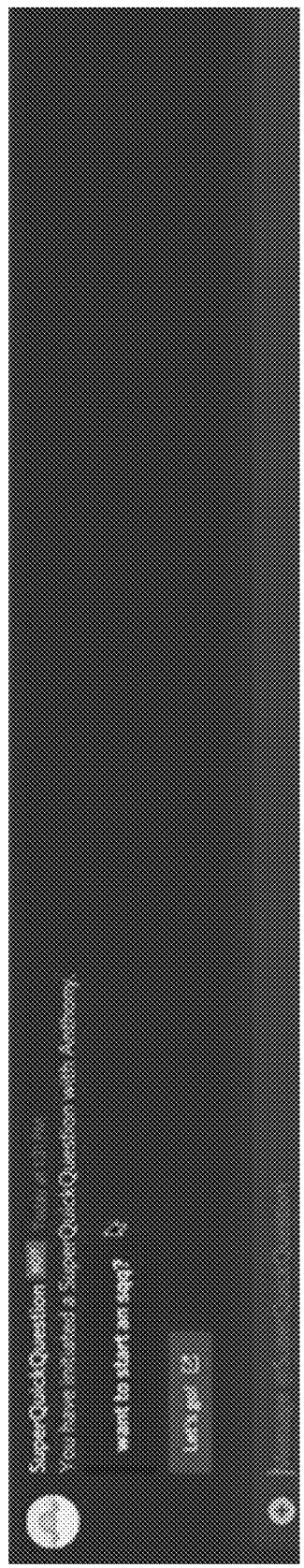
FIG. 38 illustrates an exemplary meeting link to participate in a timed one-on-one video conference call according to an embodiment.

FIG. 38 presents an exemplary meeting link to participate in a timed video call according to an embodiment. The link is transmitted over the communication network 3506 to the first user device 3504A and the second user device 3504B. In an exemplary embodiment, the link is generated and transmitted by an API of the communication server 3502 in response to a request from the user account 3514 associated with the social media platform server 3512, such as the Discord® server. In an exemplary embodiment, the link may connect the first user device 3504A and the second user device 3504B to a corresponding timed video call referenced in the database of the communication server 3502 over the communication network 3506 when engaged by the host and the guest. The link may be provided by a DM, SMS, or shared by other forms of electronic communications.

FIGS. 1 through 38 are conceptual illustrations allowing for an explanation of the disclosed embodiments. Notably, the figures and examples above are not meant to limit the scope of the present invention to a single embodiment, as other embodiments are possible by way of interchange of some or all of the described or illustrated elements. Moreover, where certain elements of the disclosed embodiments can be partially or fully implemented using known components, only those portions of such known components that are necessary for an understanding of the disclosed embodiments are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosed embodiments encompass present and future known equivalents to the known components referred to herein by way of illustration.

It should be understood that various aspects of the embodiments could be implemented in hardware, firmware, software, or combinations thereof. In such embodiments, the various components and/or steps would be implemented in hardware, firmware, and/or software to perform the functions of the embodiments. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A computer-implemented method for facilitating a timed video call performed by a user account associated with a social media platform server designed to support communication among a defined group of users, the social media platform server being coupled to a communication network, the method comprising:
receiving over the communication network a request from a host user on a first user device to initiate the timed video call with a guest user on a second user device, the timed video call having a predefined duration, the request comprising a typed command following a predetermined syntax;

parsing the typed command to identify the guest user and the second user device;

transmitting the request over the communication network to an application programming interface of a communication server, wherein transmission of the request causes the application programming interface to transmit over the communication network to the user account a first and second unique meeting link to participate in the timed video call;

transmitting the first unique meeting link to the first user device and the second unique meeting link to the second user device, wherein a response to at least one of the first or second unique meeting link by at least one of the host user or the guest user is received by the communication server over the communication network;

wherein based at least in part on the received response, the response being configured to redirect the at least host user or the guest user to the communication server which initiates the timed video call to stream video and audio between the first user device and the second user device, the streamed video and audio rendered on a call interface on the first user device and the second user device, the call interface including a timer corresponding to a length of time used in or remaining from the predefined duration of the timed video call; and wherein the end of the predefined duration causes the termination of the timed video call by the communication server.

2. The computer-implemented method of claim 1, wherein initiating the timed video call comprises initiating the timed video call only between the first and second user devices.

3. The computer-implemented method of claim 1, wherein initiating the timed video call comprises initiating the timed video call between at least the first and second user devices and a second guest user on a third user device.

4. The computer-implemented method of claim 1, wherein the step of receiving the typed command comprises receiving a typed command including a target field identifying the guest user on the second user device.

5. The computer-implemented method of claim 4, wherein the step of including the target field comprises including a target field including at least a username.

6. The computer-implemented method of claim 1, wherein the step of receiving the typed command comprises receiving a typed command including a field identifying the purpose of the timed video call.

7. The computer-implemented method of claim 1, wherein the first and second unique meeting links are the same link.

8. The computer-implemented method of claim 1, wherein the communication server transmits over the communication network a lobby interface to be rendered on both the first user device of the host user and the second user device of the guest user, the lobby interface including a join button.

9. The computer-implemented method of claim 8, wherein the step of transmitting the lobby interface comprises transmitting a lobby interface including functionality for selecting a camera source and an audio source providing a video stream and an audio stream used within the timed video call.

10. The computer-implemented method of claim 8, wherein the step of rendering the call interface comprises rendering a call interface on the first user device of the host user and the second user device of the guest user only after both the host user on the first user device and the guest user on the second user device have interacted with the join button.

11. The computer-implemented method of claim 10, wherein the step of interacting with the join button comprises:

the host user on the first user device interacting with a join button causing the communication server to render a meeting waiting area interface on the first user device of the host user;

the meeting waiting area interface including a leave button and functionality for selecting a camera source and an audio source providing a video stream and an audio stream used within the timed video call; and the meeting waiting area interface persisting until the guest user on the second user device has also interacted with the join button, or until the expiration of a preconfigured duration of time at which point the meeting expires.

12. The computer-implemented method of claim 1, wherein the step of rendering the call interface comprises rendering a call interface including a leave button and functionality for selecting a camera source and an audio source providing a video stream and an audio stream used within the timed video call.

13. The computer-implemented method of claim 12, wherein interacting with the leave button terminates the timed video call.

14. The computer-implemented method of claim 1, wherein the step of rendering the call interface comprises rendering a call interface including a host user video window that displays a video stream originating from the first user device and a guest user video window that displays a video stream originating from the second user device.

15. The computer-implemented method of claim 1, wherein the step of rendering the call interface comprises rendering a call interface including a timer including a question portion indicator corresponding to a first length of time, and an answer portion indicator corresponding to a second length of time.

16. The computer-implemented method of claim 14, wherein the step of rendering the host user and guest user video windows comprises rendering a host user video window sized to encompass a majority of the call interface and a guest user video window sized to encompass a minority of the call interface during a question portion corresponding to a first length of time on the timer.

17. The computer-implemented method of claim 14, wherein the step of rendering the host user and guest user video windows comprises rendering a guest user video window sized to encompass a majority of the call interface and a host user video window sized to encompass a minority of the call interface during an answer portion corresponding to a second length of time on the timer.

18. The computer-implemented method of claim 1, wherein the social media platform server is the Discord® server.

19. A system for facilitating a timed video call performed by a user account associated with a social media platform designed to support communication among a defined group of users, the social media platform server being coupled to a communication network, the system comprising:

a processor; and a memory having executable instructions stored thereon that when executed by the processor cause the processor to:

receive over the communication network a request from a host user on a first user device to initiate the timed video call with a guest user on a second user device, the timed video call having a predefined duration, the request comprising a typed command following a predetermined syntax;

parse the typed command to identify the guest user and second user device;

transmit the request over the communication network to an application programming interface of a communication server, wherein transmission of the request causes the application programming interface to transmit over the communication network to the user account a first and second unique meeting link to participate in the timed video call;

transmit the first unique meeting link to the first user device and the second unique meeting link to the second user device, wherein a response to at least one of the first or second unique meeting link by at least one of the host user or the guest user is received by the communication server over the communication network;

based at least in part on the received response, the response being configured to redirect the at least host user or the guest user to the communication server which initiates the timed video call to stream video and audio between the first user device and the second user device, the streamed video and audio rendered on a call interface on the first user device and the second user device, the call interface including a timer corresponding to a length of time used in or remaining from the predefined duration of the timed video call; and wherein the end of the predefined duration causes the termination of the timed video call by the communication server.

20. A computer-implemented method for facilitating a timed video call performed by a communication server designed to support communication among a defined group of users, the communication server being coupled to a communication network, the method comprising:

generating a first and second unique meeting link for a host user on a first user device to participate in the timed video call with a guest user on a second user device, in response to communications over the communication network from a user account associated with a social media platform server, the timed video call having a predefined duration;

transmitting over the communication network to the user account the first and second unique meeting links, causing the user account to transmit the first unique meeting link to the first user device and the second unique meeting link to the second user device;

receiving over the communication network a response to at least one of the first or second unique meeting link by at least one of the host user or the guest user;

based at least in part on the received response, initiating the timed video call to stream video and audio between the first user device and the second user device, the streamed video and audio rendered on a call interface on the first user device and the second user device, the call interface including a timer corresponding to a length of time used in or remaining from the predefined duration of the timed video call; and terminating the timed video call at the end of the predefined duration.

21. A system for facilitating a timed video call performed by a communication server designed to support communication among a defined group of users, the communication server being coupled to a communication network, the system comprising:

a processor; and a memory having executable instructions stored thereon that when executed by the processor cause the processor to:

generate a first and second unique meeting link for a host user on a first user device to participate in the timed video call with a guest user on a second user device, in response to communications over the communication network from a user account associated with a social media platform server, the timed video call having a predefined duration;

transmit over the communication network to the user account the first and second unique meeting links, causing the user account to transmit the first unique meeting link to the first user device and the second unique meeting link to the second user device;

receive over the communication network a response to at least one of the first or second unique meeting link by at least one of the host user or the guest user;

based at least in part on the received response, initiate the timed video call to stream video and audio between the first user device and the second user device, the streamed video and audio rendered on a call interface on the first user device and the second user device, the call interface including a timer corresponding to a length of time used in or remaining from the predefined duration of the timed video call; and terminate the timed video call at the end of the predefined duration.

\* \* \* \* \*